(12) United States Patent
Lee et al.

(10) Patent No.: US 9,897,696 B2
(45) Date of Patent: Feb. 20, 2018

(54) METHOD OF RECOGNIZING SURROUNDING ENVIRONMENT AND ELECTRONIC DEVICE FOR THE SAME

(71) Applicant: Samsung Electronics Co., Ltd., Gyeonggi-do (KR)

(72) Inventors: Dong-Ju Lee, Daegu (KR); Ji-Woo Lee, Gyeongsangbuk-do (KR); Chul-Hyung Yang, Gyeongsangbuk-do (KR); Han-Jae Bae, Gyeongsangbuk-do (KR); Bong-Sup Son, Daegu (KR)

(73) Assignee: Samsung Electronics Co., Ltd (KR)

( * ) Notice: Subject to any disclaimer, the term of this patent is extended or adjusted under 35 U.S.C. 154(b) by 14 days.

(21) Appl. No.: 15/136,283

(22) Filed: Apr. 22, 2016

(65) Prior Publication Data

US 2016/0345113 A1    Nov. 24, 2016

(30) Foreign Application Priority Data

May 22, 2015  (KR) .................. 10-2015-0072094

(51) Int. Cl.
   *H04R 29/00*   (2006.01)
   *G01S 15/04*   (2006.01)

(52) U.S. Cl.
   CPC .... *G01S 15/04* (2013.01); *G06F 2203/04108* (2013.01)

(58) Field of Classification Search
   CPC ..................................................... H04R 29/00
   See application file for complete search history.

(56) References Cited

U.S. PATENT DOCUMENTS

| 7,804,742 B2 | 9/2010 | Ray et al. | |
| 2012/0235963 A1* | 9/2012 | Oshinome | G09G 5/00 345/204 |
| 2016/0246449 A1* | 8/2016 | Jarske | G06F 3/0436 |

\* cited by examiner

*Primary Examiner* — Olisa Anwah
(74) *Attorney, Agent, or Firm* — The Farrell Law Firm, P.C.

(57) ABSTRACT

An electronic device is provided. The electronic device includes a housing, at least one ultrasonic wave generator and at least one ultrasonic sensor operatively disposed on the housing, and a processor electrically connected to the at least one ultrasonic wave generator and the at least one ultrasonic sensor and configured to emit ultrasonic waves from at least one surface of the housing using the at least one ultrasonic wave generator, receive reflected waves reflected from at least one object through the at least one ultrasonic sensor, and determine a proximity between the electronic device and the object based on at least a difference between a first time, at which the ultrasonic waves are emitted, and a second time, at which the reflected waves are received.

19 Claims, 15 Drawing Sheets

METHOD OF RECOGNIZING SURROUNDING ENVIRONMENT AND ELECTRONIC DEVICE FOR THE SAME

PRIORITY

This application claims priority under 35 U.S.C. § 119(a) to Korean Patent Application Serial No. 10-2015-0072094, which was filed in the Korean Intellectual Property Office on May 22, 2015, the entire disclosure of which is incorporated herein by reference.

BACKGROUND

1. Field of the Disclosure

The present disclosure relates generally to an electronic device, and more particularly, to a method of recognizing a surrounding environment, and an electronic device for the same.

2. Description of the Prior Art

According to an improvement in the performance of an electronic device (for example, a smart phone or a wearable electronic device), the electronic device may provide a user with applications that have various functions. The electronic device may also provide a user with various kinds of information related to an application according to a characteristic of a function provided by the application.

In order to perform various functions of the electronic device, an auxiliary device for recognizing a surrounding environment or for recognizing a motion of the electronic device and the like may be required. The auxiliary device may include, for example, various sensors. The sensors may include a proximity sensor for recognizing proximity of an external object in relation to the electronic device, a gyro sensor and a geomagnetic sensor for detecting a motion of the electronic device, a temperature sensor for measuring a temperature of a surrounding area, a heartbeat sensor for measuring a heartbeat of a human body, a luminance sensor for detecting luminance of a surrounding area and controlling brightness of a display and the like, a fingerprint recognizing sensor used as an authentication tool for exclusively using the electronic device, an infrared sensor for transmitting a signal for controlling an external device, and an ultrasonic sensor for recognizing a gesture of an external object or detecting proximity of an object.

The electronic device may include an ultrasonic transducer, which may include an ultrasonic transmitter, which is mounted on an external surface of the electronic device to be exposed to radiate ultrasonic waves, and a receiver, which receives reflected waves of the transmitted ultrasonic waves reflected from a surrounding medium (for example, an object, such as air, a liquid, a human body, etc.). A function of the ultrasonic transducer may be defined in relation to a reflection coefficient with respect to the waves reflected from the surrounding medium. The ultrasonic transducer may also be utilized as a proximity sensor for recognizing an object and for controlling a function of the electronic device.

However, the ultrasonic transducer can only recognize a proximity of the object, regardless of the kind of object, thus the ultrasonic transducer may incorrectly recognize that an object (for example, a human body) approaches in a flooding situation of the electronic device, and a separate function is not provided in the flooding situation of the electronic device. The flooding situation indicates that water drop or water is contact with touch screen display of the electronic device or located on the touch screen display.

SUMMARY

The present disclosure has been made to address at least the above mentioned problems and/or disadvantages and to provide at least the advantages described below.

Accordingly, an aspect of the present disclosure provides a method of recognizing a surrounding environment and an electronic device for the same.

Another aspect of the present disclosure provides a method of recognizing a surrounding environment and an electronic device for the same, which are configured to accurately recognize a characteristic of a contact medium by using heterogeneous ultrasonic transducers.

Another aspect of the present disclosure provides a method of recognizing a surrounding environment and an electronic device for the same, which are configured to simultaneously perform a function of recognizing a surrounding environment and an input function.

Another aspect of the present disclosure provides a method of recognizing a surrounding environment and an electronic device for the same, which are configured to accurately recognize a flooding situation of an electronic device by exclusive operations of a contact-type ultrasonic transducer and a non-contact-type ultrasonic transducer on the same medium interface.

Another aspect of the present disclosure provides a method of recognizing a surrounding environment and an electronic device for the same, which are configured to perform an input function even in a flooding situation.

In accordance with an aspect of the present disclosure, there is provided an electronic device. The electronic device includes a housing, at least one ultrasonic wave generator and at least one ultrasonic sensor operatively disposed on the housing, and a processor electrically connected to the at least one ultrasonic wave generator and the at least one ultrasonic sensor and configured to emit ultrasonic waves from at least one surface of the housing using the at least one ultrasonic wave generator, receive reflected waves reflected from at least one object through the at least one ultrasonic sensor, and determine a proximity between the electronic device and the object based on at least a difference between a first time, at which the ultrasonic waves are emitted, and a second time, at which the reflected waves are received.

In accordance with another aspect of the present disclosure, there is provided a method of operating an electronic device. The method includes emitting a first ultrasonic signal through a first ultrasonic transducer, confirming whether a reception arrival time of reflected waves of the emitted first ultrasonic signal is within a threshold range, activating a second ultrasonic transducer and emitting a second ultrasonic signal when the reception arrival time of the reflected waves is within the threshold range, confirming a reflection coefficient based on the received reflected waves for the second ultrasonic signal, and performing a function corresponding to an object confirmed based on the confirmed reflection coefficient.

In accordance with still another aspect of the present disclosure, there is provided an electronic device. The electronic device includes a non-contact type ultrasonic transducer including a transmitter emitting a first ultrasonic signal and a receiver receiving reflected waves of the emitted first ultrasonic signal, a contact type ultrasonic transducer configured to emit a second ultrasonic signal and to receive reflected waves of the emitted second ultrasonic signal, and a processor connected to the non-contact type ultrasonic transducer and the contact type ultrasonic transducer and configured to confirm whether a reception arrival time of reflected waves of the emitted first ultrasonic signal is within a threshold range, activate the contact type ultrasonic transducer and emit the second ultrasonic signal when the reception arrival time of the reflected waves is within the threshold range, confirm a reflection coefficient based on the received reflected waves of the second ultrasonic signal, and perform a function corresponding to an object confirmed based on the confirmed reflection coefficient.

BRIEF DESCRIPTION OF THE DRAWINGS

The above and other aspects, features, and advantages of the present disclosure will be more apparent from the following detailed description in conjunction with the accompanying drawings, in which.

DETAILED DESCRIPTION

Figure 1:
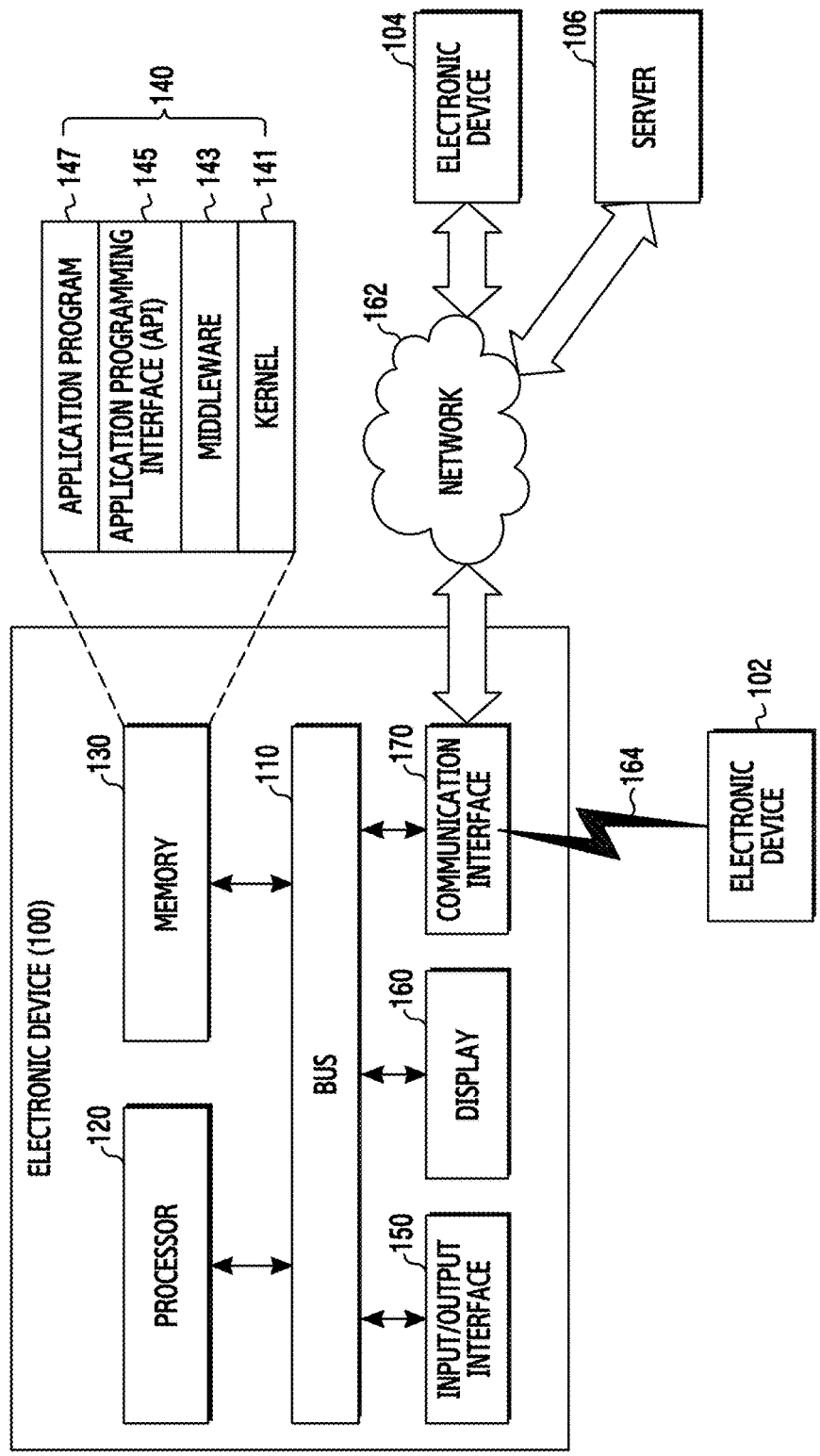
FIG. 1 is a diagram illustrating a network environment including an electronic device, according to an embodiment of the present disclosure.

The following description with reference to the accompanying drawings is provided to assist in a comprehensive understanding of certain embodiments of the present disclosure as defined by the claims and their equivalents. It includes specific details to assist in that understanding but these are to be regarded merely as examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "include" and "may include" used herein are intended to indicate the presence of a corresponding function, operation, or constitutional element disclosed herein, and are not intended to limit the presence of one or more functions, operations, or constitutional elements. In addition, the terms "include" and "have" are intended to indicate that characteristics, numbers, operations, constitutional elements, and elements disclosed in the specification or combinations thereof exist. However, additional possibilities of one or more other characteristics, numbers, operations, constitutional elements, elements or combinations thereof may exist.

As used herein, the expression "or" includes any and all combinations of words enumerated together. For example, "A or B" may include either A or B, or may include both A and B.

Although expressions used in various embodiments of the present disclosure, such as "1st", "2nd", "first", "second" may be used to express various constituent elements of the various embodiments of the present disclosure, these expressions are not intended to limit the corresponding constituent elements. For example, the above expressions are not intended to limit an order or an importance of the corresponding constituent elements. The above expressions may be used to distinguish one constituent element from another constituent element. For example, a first user device and the second user device are both user devices, and indicate different user devices. For example, a first constituent element may be referred to as a second constituent element, and similarly, the second constituent element may be referred to as the first constituent element without departing from the scope of the present disclosure.

When an element is mentioned as being "connected" to or "accessing" another element, this may mean that it is directly connected to or accessing the other element, or there may be intervening elements present between the two elements. On the other hand, when an element is mentioned as being "directly connected" to or "directly accessing" another element, it is to be understood that there are no intervening elements present.

The term "module" as used herein may imply a unit including one of hardware, software, and firmware, or a combination thereof. The term "module" may be interchangeably used with terms, such as unit, logic, logical block, component, circuit, and the like. A module as described herein may be a minimum unit of an integrally constituted component or may be a part thereof. The module may be a minimum unit for performing one or more functions or may be a part thereof. The module may be mechanically or electrically implemented. For example, the module as described herein includes at least one of an application-specific IC (ASIC) chip, a field-programmable gate arrays (FPGAs), and a programmable-logic device, which are known or will be developed and which perform certain operations.

By the term "substantially" it is meant that the recited characteristic, parameter, or value need not be achieved exactly, but that deviations or variations, including, but not limited to, for example, tolerances, measurement errors, measurement accuracy limitations and other factors known to persons of ordinary skill in the art, may occur in amounts that do not preclude the effect the characteristic was intended to provide.

Unless otherwise defined, all terms, including technical and scientific terms, used herein have the same meaning as commonly understood by those of ordinary skill in the art to which various embodiments of the present disclosure belong. It will be further understood that terms, such as those defined in commonly used dictionaries, should be interpreted as having meanings that are consistent with their meaning in the context of the relevant art and the various embodiments of the present disclosure, and should not be interpreted in an idealized or overly formal sense unless expressly so defined herein.

An electronic device as used herein may be a device including, but not limited to, an antenna capable of performing a communication function in at least one frequency band. For example, the electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a mobile medical device, a camera, and a wearable device (e.g., a head-mounted-device (HMD), such as electronic glasses, electronic clothes, an electronic bracelet, an electronic necklace, an electronic appcessory, an electronic tattoo, a smart watch, and the like).

The electronic device may be a smart home appliance having an antenna. For example, the smart home appliance may include at least one of a television (TV), a digital versatile disc (DVD) player, an audio player, a refrigerator, an air conditioner, a cleaner, an oven, a microwave oven, a washing machine, an air purifier, a set-top box, a TV box (e.g., Samsung HomeSync®, Apple TV®, or Google TV®), a game console, an electronic dictionary, an electronic key, a camcorder, and an electronic picture frame.

The electronic device including the antenna may be one of various medical devices (e.g., magnetic resonance angiography (MRA), magnetic resonance imaging (MRI), computed tomography (CT), imaging equipment, an ultrasonic instrument, and the like), a navigation device, a global positioning system (GPS) receiver, an event data recorder (EDR), a flight data recorder (FDR), a car infotainment device, electronic equipment for a ship (e.g., a vessel navigation device, a gyro compass, and the like), avionics, a security device, a car head unit, an industrial or domestic robot, an automatic teller machine (ATM), a point of sales (POS) device, and the like.

The electronic device may be part of at least one of an item of furniture or a building/structure including an antenna. The electronic device may be an electronic board, an electronic signature input device, a projector, or any of various measurement machines (e.g., water supply, electricity, gas, a propagation measurement machine, and the like).

The electronic device may be one or more combinations of the aforementioned various devices. In addition, the electronic device may be a flexible device. Moreover, the electronic device is not limited to the aforementioned devices.

Hereinafter, an electronic device according to various embodiments will be described with reference to the accompanying drawings. The term 'user' used in the various embodiments may refer to a person who uses the electronic device or a device which uses the electronic device (e.g., an artificial intelligence (AI) electronic device).

FIG. 1 is a diagram illustrating a network environment including an electronic device, according to an embodiment of the present disclosure.

Referring to FIG. 1, the electronic device 100 includes a bus 110, a processor 120, a memory 130, an input/output interface 150, a display 160, and a communication interface 170. In various embodiments of the present disclosure, the electronic device 100 can omit at least one of the components or further include another component.

The bus 110 includes a circuit for connecting the components (e.g., the processor 120, the memory 130, the input/output interface 150, the display 160, and the communication interface 170) and delivering communications (e.g., a control message) therebetween.

The processor 120 includes one or more of a Central processing Unit (CPU), an Application Processor (AP), and a Communication Processor (CP). The processor 120 processes an operation or data on control of and/or communication with another component of the electronic device 100.

The processor 120, which is connected to the LTE network, determines whether a call is connected over the CS service network using caller identification information (e.g., a caller phone number) of the CS service network (e.g., the 2G/3G network). For example, the processor 120 receives incoming call information (e.g., a CS notification message or a paging request message) of the CS service network over the LTE network (e.g., CSFB). For example, the processor 120 being connected to the LTE network receives incoming call information (e.g., a paging request message) over the CS service network (e.g., SRLTE).

When receiving the incoming call information (e.g., a CS notification message or a paging request message) of the CS service network over the LTE network, the processor 120 obtains caller identification information from the incoming call information. The processor 120 displays the caller identification information on its display 160. The processor 120 determines whether to connect the call based on input information corresponding to the caller identification information displayed on the display 160. For example, when detecting input information corresponding to an incoming call rejection, through the input/output interface 150, the processor 120 restricts the voice call connection and maintains the LTE network connection. For example, when detecting input information corresponding to an incoming call acceptance, through the input/output interface 150, the processor 120 connects the voice call by connecting to the CS service network.

When receiving the incoming call information (e.g., a CS notification message or a paging request message) of the CS service network over the LTE network, the processor 120 obtains caller identification information from the incoming call information. The processor 120 determines whether to connect the call by comparing the caller identification information with a reception control list. For example, when the caller identification information is included in a first reception control list (e.g., a blacklist), the processor 120 restricts the voice call connection and maintains the connection to the LTE network. For example, when the caller identification information is not included in the first reception control list (e.g., the blacklist), the processor 120 connects the voice call by connecting to the CS service network. For example, when the caller identification information is included in a second reception control list (e.g., a white list), the processor 120 connects the voice call by connecting to the CS service network.

When receiving the incoming call information (e.g., a paging request message) of the CS service network over the LTE network, the processor 120 sends an incoming call response message (e.g., a paging response message) to the CS service network. The processor 120 suspends the LTE service and receives the caller identification information (e.g., a Circuit-switched Call (CC) setup message) from the CS service network. The processor 120 determines whether to connect the call by comparing the caller identification information with the reception control list. For example, when the caller identification information is included in the first reception control list (e.g., the blacklist), the processor 120 restricts the voice call connection and resumes the LTE network connection. For example, when the caller identification information is not included in the first reception control list (e.g., the blacklist), the processor 120 connects the voice call by connecting to the CS service network. For example, when the caller identification information is included in the second reception control list (e.g., the white list), the processor 120 connects the voice call by connecting to the CS service network.

The memory 130 can include volatile and/or nonvolatile memory. The memory 130 stores commands or data (e.g., the reception control list) relating to at least another component of the electronic device 100. The memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 controls or manages system resources (e.g., the bus 110, the processor 120, or the memory 130) used for performing an operation or function implemented by the other programs (e.g., the middleware 143, the API 145, or the applications 147). Furthermore, the kernel 141 provides an interface through which the middleware 143, the API 145, or the applications 147 connects the individual elements of the electronic device 100 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources (e.g., the bus 110, the processor 120, the memory 130, etc.) of the electronic device 100, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (e.g., an instruction) for file control, window control, image processing, text control, etc.

The input/output interface 150 functions as an interface that transfers instructions or data input from a user or another external device to the other element(s) of the electronic device 100. Furthermore, the input/output interface 150 outputs the instructions or data received from the other element(s) of the electronic device 100 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content (e.g., a text, images, videos, icons, symbols, etc.) for the user. The display 160 may include a touch screen and receive, for example, a touch, a gesture, proximity, a hovering input, etc., using an electronic pen or the user's body part. The display 160 may display a web page.

The communication interface 170 can establish a communication between the electronic device 100 and an external electronic device (e.g., a first external electronic device 102, a second external electronic device 104, or a server 106). For example, the communication interface 170 can communicate with the first external electronic device 102, the second external electronic device 104, or the server 106 in connection to the network 162 through wireless communication or wired communication. For example, the wireless communication can conform to a cellular communication protocol including at least one of LTE, LTE-Advanced (LTE-A), CDMA, WCDMA, Universal Mobile Telecommunication System (UMTS), WiBro, and GSM.

The wired communication can include at least one of Universal Serial Bus (USB), High Definition Multimedia Interface (HDMI), Recommended Standard 232 (RS-232), and Plain Old Telephone Service (POTS).

The network 162 can include at least one of telecommunications networks, for example, a computer network (e.g., Local Area Network (LAN) or Wide Area Network (WAN)), Internet, and a telephone network.

The electronic device 100 provides the LTE service in the single radio environment by use of at least one module functionally or physically separated from the processor 120. Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member is formed of a single material.

Each of the first and second external electronic devices 102 and 104 may be a type of device that is the same as or different from the electronic device 101. According to one embodiment, the server 106 may include a group of one or more servers. According to various embodiments, all or some of the operations to be executed by the electronic device 101 may be executed by another electronic device or a plurality of other electronic devices (e.g., the electronic devices 102 and 104 or the server 106). According to one embodiment, in the case where the electronic device 101 should perform a certain function or service automatically or by request, the electronic device 101 may request some functions that are associated therewith from the other electronic devices (e.g., the electronic devices 102 and 104 or the server 106) instead of or in addition to executing the function or service by itself. The other electronic devices (e.g., the electronic devices 102 and 104 or the server 106) may execute the requested functions or additional functions, and may transmit the results to the electronic device 101. The electronic device 101 may provide the requested functions or services by processing the received results as they are or additionally. For this purpose, for example, a cloud computing technique, a distributed computing technique, or a client-server computing technique may be used.

Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member is formed of a single material.

Figure 2:
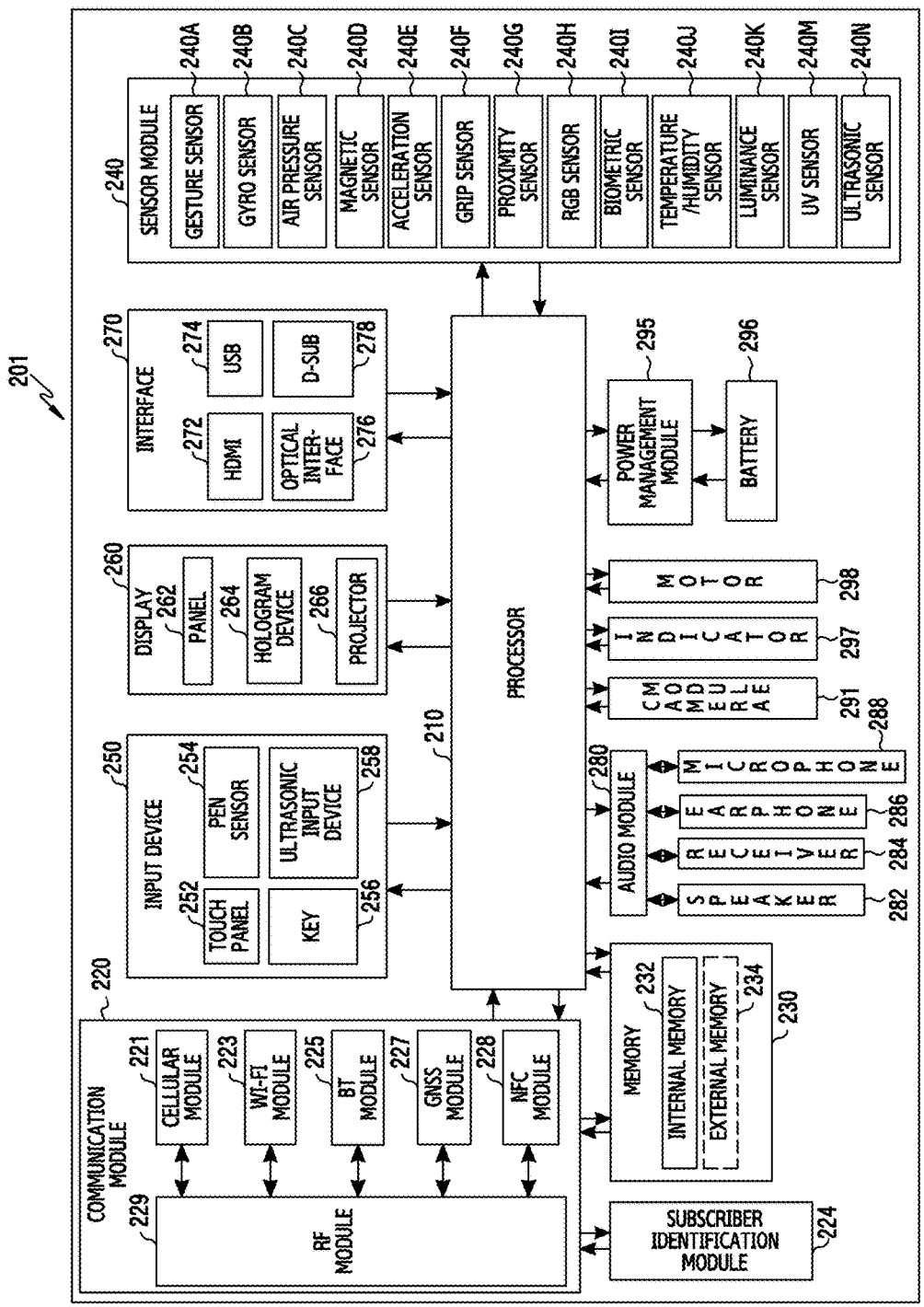
FIG. 2 is a diagram illustrating an electronic device, according to an embodiment of the present disclosure.

FIG. 2 is a diagram of a configuration of an electronic device 201, according to an embodiment of the present disclosure.

Referring to FIG. 2, a configuration of the electronic device 201 is provided. The electronic device 201 may include all or some of the components described with reference to the electronic device 101 of FIG. 1. The electronic device 201 includes at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a plurality of hardware or software elements connected to the AP 210 by driving an operating system (OS) or an application program. The AP 210 processes a variety of data, including multimedia data, and performs arithmetic operations. The AP 210 may be implemented, for example, with a system on chip (SoC). The AP 210 may further include a Graphical processing unit (GPU).

The communication module 220 performs data transmission/reception in communication between the external electronic device 104 or the server 106 which may be connected with the electronic device 201 through the network 162. The communication module 220 includes a cellular module 221, a Wi-Fi module 223, a BT module 225, a global navigation satellite system (GNSS) or GPS module 227, a NFC module 228, and a radio frequency (RF) module 229.

The cellular module 221 provides a voice call, a video call, a text service, an internet service, and the like, through a communication network (e.g., LTE, LTE-A, CDMA, WCDMA, UMTS, WiBro, and GSM, and the like). In addition, the cellular module 221 identifies and authenticates the electronic device 201 within the communication network by using the SIM card 224. The cellular module 221 may perform at least some of functions that can be provided by the AP 210. For example, the cellular module 221 may perform at least some of multimedia control functions.

The cellular module 221 includes a communication processor (CP). Further, the cellular module 221 may be implemented, for example, with an SoC. Although elements, such as the cellular module 221 (e.g., the CP), the memory 230, and the power management module 295 are illustrated as separate elements with respect to the AP 210 in FIG. 2, the AP 210 may also be implemented such that at least one part (e.g., the cellular module 221) of the aforementioned elements is included in the AP 210.

The AP 210 or the cellular module 221 loads an instruction or data, which is received from each non-volatile memory connected thereto or at least one of different elements, to a volatile memory and processes the instruction or data. In addition, the AP 210 or the cellular module 221 stores data, which is received from at least one of different elements or generated by at least one of different elements, into the non-volatile memory.

Each of the Wi-Fi module 223, the BT module 225, the GNSS module 227, and the NFC module 228 includes a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least some (e.g., two or more) of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228 (e.g., a communication processor corresponding to the cellular module 221 and a Wi-Fi processor corresponding to the Wi-Fi module 223) may be implemented with an SoC.

The RF module 229 transmits/receives data, for example an RF signal. The RF module 229 may include, for example, a transceiver, a power amp module (PAM), a frequency filter, a low noise amplifier (LNA), and the like. In addition, the RF module 229 may further include a component for transmitting/receiving a radio wave on a free space in wireless communication, for example, a conductor, a conducting wire, and the like. Although it is illustrated in FIG. 2 that the cellular module 221, the Wi-Fi module 223, the BT module 225, the GNSS module 227, and the NFC module 228 share one RF module 229, a at least one of the cellular module 221, the Wi-Fi module 223, the BT module 225, the GNSS module 227, the NFC module 228 may transmit/receive an RF signal via a separate RF module.

The SIM card 224 may be inserted into a slot formed at a specific location of the electronic device 201. The SIM card 224 includes unique identification information (e.g., an integrated circuit card identifier (ICCID)) or subscriber information (e.g., an international mobile subscriber identity (IMSI)).

The memory 230 includes an internal memory 232 or an external memory 234.

The internal memory 232 may include, for example, at least one of a volatile memory (e.g., a dynamic random access memory (DRAM), a static RAM (SRAM), a synchronous dynamic RAM (SDRAM), and the like) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like). The internal memory 232 may be a solid state drive (SSD).

The external memory 234 may include a flash drive, and may further include, for example, compact flash (CF), secure digital (SD), micro-SD, mini-SD, extreme digital (xD), memory stick, and the like. The external memory 234 may be operatively coupled to the electronic device 201 via various interfaces.

The electronic device 201 may further include a storage unit (or a storage medium), such as a hard drive.

The sensor module 240 measures a physical quantity or detects an operation state of the electronic device 201, and converts the measured or detected information into an electric signal. The sensor module 240 includes, for example, at least one of a gesture sensor 240A, a gyro sensor 240B, a barometric pressure sensor or air sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination/illuminance sensor 240K, an ultraviolet (UV) sensor 240M and ultrasonic sensor 240N.

The ultrasonic sensor 240N may include at least one ultrasonic transducer. The ultrasonic sensor 240N may include a contact type ultrasonic transducer (for example, an enclosed type ultrasonic transducer) and a non-contact type ultrasonic transducer (for example, a resonant type ultrasonic transducer), each of which are described in greater detail below. The contact type ultrasonic transducer and the non-contact type ultrasonic transducer may be controlled to be exclusively or simultaneously operated under a control of the processors 120, 220.

Additionally or alternatively, the sensor module 240 may include, for example, an E-node sensor, an electromyography (EMG) sensor, an electroencephalogram (EEG) sensor, an electrocardiogram (ECG) sensor, a fingerprint sensor, and the like.

The sensor module 240 may further include a control circuit for controlling at least one or more sensors included therein.

The input device 250 includes a touch panel 252, a (digital) pen sensor 254, a key 256, or an ultrasonic input unit 258.

The touch panel 252 recognizes a touch input, for example, by using at least one of an electrostatic type configuration, a pressure-sensitive type configuration, and an ultrasonic type configuration. The touch panel 252 may further include a control circuit. In the instance where the touch panel is of the electrostatic type, not only is physical contact recognition possible, but proximity recognition is also possible. The touch penal 252 may further include a tactile layer, which provides the user with a tactile reaction.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect ultrasonic waves generated by an input tool through the microphone 288, and may confirm data corresponding to the detected ultrasonic waves.

The (digital) pen sensor 254 may be implemented, for example, by using the same or similar method of receiving a touch input of the user or by using an additional sheet for recognition.

The key 256 may be, for example, a physical button, an optical key, a keypad, or a touch key.

The ultrasonic input unit 258 is a device by which the electronic device 201 detects a reflected sound wave through a microphone 288 and is capable of radio recognition. For example, a an ultrasonic signal, which may be generated by using a pen, may be reflected off an object and detected by the microphone 288.

The electronic device 201 may use the communication module 220 to receive a user input from an external device (e.g., a computer or a server) connected thereto.

The display 260 includes a panel 262, a hologram 264, or a projector 266.

The panel 262 may be, for example, a liquid-crystal display (LCD), an active-matrix organic light-emitting diode (AM-OLED), and the like. The panel 262 may be implemented, for example, in a flexible, transparent, or wearable manner. The panel 262 may be constructed as one module with the touch panel 252.

The hologram device 264 uses an interference of light and displays a stereoscopic image in the air.

The projector 266 displays an image by projecting a light beam onto a screen. The screen may be located inside or outside the electronic device 201.

The display 260 may further include a control circuit for controlling the panel 262, the hologram device 264, or the projector 266.

The interface 270 includes, for example, an HDMI 272, a USB 274, an optical communication interface 276, or a D-subminiature (D-sub) 278. The interface 270 may be included, for example, in the communication interface 160 of FIG. 1. Additionally or alternatively, the interface 270 may include, for example, mobile high-definition link (MHL), SD/multi-media card (MMC) or infrared data association (IrDA).

The audio module 280 bilaterally converts a sound and an electric signal. At least some elements of the audio module 280 may be included in the input/output interface 150 of FIG. 1. The audio module 280 converts sound information which is input or output through a speaker 282, a receiver 284, an earphone 286, the microphone 288, and the like.

The speaker 282 may output a signal of an audible frequency band and a signal of an ultrasonic frequency band. Reflected waves of an ultrasonic signal emitted from the speaker 282 may be received, or a signal of an external audible frequency band may also be received.

The camera module 291 is a device for image and video capturing, and may include one or more image sensors (e.g., a front sensor or a rear sensor), a lens, an image signal processor (ISP), or a flash (e.g., an LED or a xenon lamp). In certain instances, it may prove advantageous to include two or more camera modules.

The power management module 295 manages power of the electronic device 201. The power management module 295 may include a power management integrated circuit (PMIC), a charger IC, or a battery gauge.

The PMIC may be placed inside an IC or SoC semiconductor. Charging is classified into wired charging and wireless charging. The charger IC charges a battery, and prevents an over-voltage or over-current flow from a charger. The charger IC includes a charger IC for at least one of the wired charging and the wireless charging.

The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge measures, for example, a residual quantity of the battery 296 and a voltage, current, and temperature during charging. The battery 296 stores or generates electricity and supplies power to the electronic device 201 by using the stored or generated electricity. The battery 296 may include a rechargeable battery or a solar battery.

The indicator 297 indicates a specific state, for example, a booting state, a message state, a charging state, and the like, of the electronic device 201 or a part thereof (e.g., the AP 210).

The motor 298 converts an electric signal into a mechanical vibration.

The electronic device 201 includes a processing unit (e.g., a GPU) for supporting mobile TV. The processing unit for supporting mobile TV processes media data according to a protocol of, for example, digital multimedia broadcasting (DMB), digital video broadcasting (DVB), media flow, and the like.

Each of the aforementioned elements of the electronic device 201 may consist of one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

At least some parts of a device (e.g., modules or functions thereof) or method (e.g., operations) may be implemented with an instruction stored in a computer-readable storage media for example. The instruction may be executed by the processor 210, to perform a function corresponding to the instruction. The computer-readable storage media may be, for example, the memory 230. At least some parts of the programming module may be implemented (e.g., executed), for example, by the processor 210. At least some parts of the programming module may include modules, programs, routines, sets of instructions, processes, and the like, for performing one or more functions.

Figure 3:
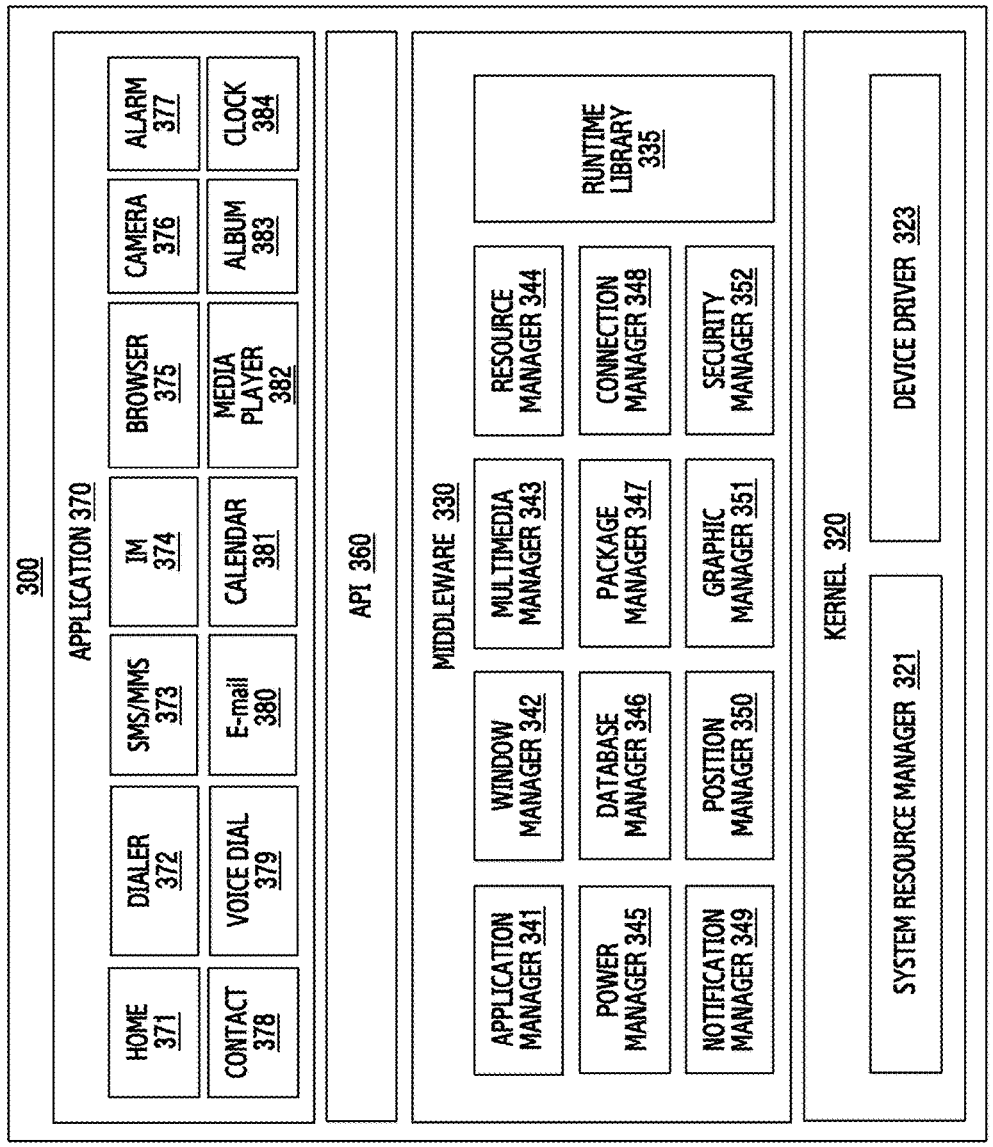
FIG. 3 is a diagram illustrating a program module, according to an embodiment of the present disclosure.

FIG. 3 is a diagram illustrating a program module 300, according to an embodiment of the present disclosure.

The program module 300 may include an OS for controlling resources related to the electronic devices 101, 201 (hereinafter "the electronic device") and/or various applications (for example, the application programs 147) executed in the operating system. The operating system may be, for example, Android®, iOS®, Windows®, Symbian®, Tizen®, Bada®, or the like.

The program module 300 may include a kernel 320, middleware 330, an API 360, and/or an application 370. At least some of the program module 300 may be preloaded on the electronic device, or may be downloaded from an external electronic devices 102 or 104, or the server 106).

The kernel 320 may include, for example, a system resource manager 321 and/or a device driver 323. The system resource manager 321 may perform the control, allocation, retrieval, or the like of system resources. The system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources within the electronic device. The middleware 330 may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage graphical user interface (GUI) resources used on the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

For example, the power manager 345 may operate together with a basic input/output system (BIOS). and may manage a battery or power, and may provide power information and the like required for an operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. When the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 is, for example, a set of API programming functions, and may be provided with a different configuration according to an OS. For example, in the case of Android® or iOS® OSs, one API set may be provided for each platform. In the case of Tizen®, two or more API sets may be provided for each platform.

The applications 370 may include, for example, one or more applications that are capable of performing functions of home 371, dialer 372, SMS/MMS 373, instant message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

The applications 370 may include an application (hereinafter, referred to as an "information exchange application") supporting information exchange between the electronic device and the external electronic devices 102 or 104. The information exchange application may include, for example, a notification relay application for forwarding specific information to the external electronic devices 102 or 104, or a device management application for managing the external electronic devices 102 or 104.

For example, the notification relay application may include a function of delivering, to the external electronic devices 102 or 104, notification information generated by other applications (e.g., an SMS/MMS application, an email application, a health care application, an environmental information application, etc.) of the electronic device. Further, the notification relay application may receive notification information from, for example, an external electronic device and may provide the received notification information to a user.

The device management application may manage (e.g., install, delete, or update) a function for at least one of the external electronic devices 102 and 104 communicating with the electronic device (for example, turning on/off the external electronic device itself (or some elements thereof) or adjusting brightness (or resolution) of a display), applications executed in the external electronic devices 102 or 104, or services provided from the external electronic devices 102 or 104 (for example, a telephone call service or a message service).

The applications 370 may include applications (for example, a health care application of a mobile medical appliance or the like) designated according to attributes of the external electronic devices 102 or 104. The application 370 may include an application received from the server 106, or the electronic devices 102 or 104. The application 370 may include a preloaded application or a third party application which may be downloaded from the server. Names of the elements of the program module 310 may change depending on the type of OS.

At least some of the program module 310 may be implemented in software, firmware, hardware, or a combination of two or more thereof. At least some of the program module 310 may be implemented (e.g., executed) by, for example, a processor 1410, as will be described in greater detail below. At least some of the program module 310 may include, for example, a module, a program, a routine, a set of instructions, and/or a process for performing one or more functions.

The programming module 300 may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added.

Proximity of an object in relation to the electronic devices 101 and 201 may be recognized by using heterogeneous ultrasonic transducers under a control of the processors 120, 210, respectively. In accordance with embodiments of the present disclosure, it is possible to accurately recognize a flooding situation of the electronic devices 101, 201 (e.g., when the electronic devices 101, 201 come into contact with water) by using heterogeneous ultrasonic transducers. The flooding situation indicates that water drop or water is contact with touch screen display of the electronic device or located on the touch screen display. Accordingly, in a flooding situation, the electronic devices 101, 210 use a waterproofing device which may perform an input function (for example, a key input and a gesture input) by using one or more ultrasonic transducers. The ultrasonic transducer may be of a contact type ultrasonic transducer, which may be based on the enclosed type ultrasonic transducer, or the ultrasonic transducer may be of the non-contact type ultrasonic transducer, which may be based on the resonant type ultrasonic transducer, but the ultrasonic transducer is not limited thereto, and it should be understood that various ultrasonic transducers capable of sensing with different manners using ultrasonic waves may be applicable.

Hereinafter, a method, an apparatus, and a system for providing an interface will be described with reference to the accompanying drawings. However, the various embodiments of the present disclosure are not limited thereto. In the embodiments described hereinbelow, an approach method by hardware will be described, as an example. However, the embodiments of the present disclosure may include a technology that uses both hardware and software, so that an approach method based on software is not excluded in the embodiments of the present disclosure.

Figure 4:
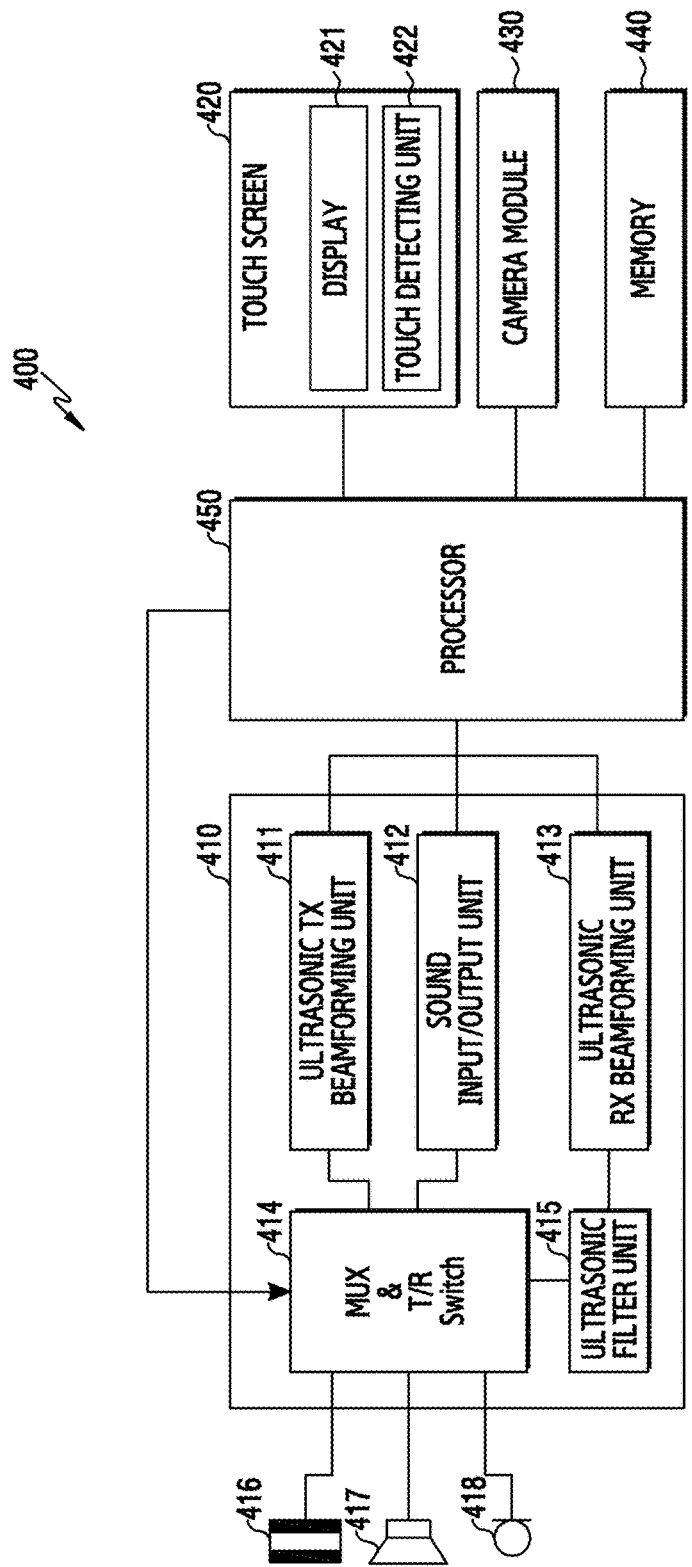
FIG. 4 is a diagram illustrating a configuration of an electronic device, according to an embodiment of the present disclosure.

FIG. 4 is a diagram illustrating a configuration of an electronic device, according to an embodiment of the present disclosure.

Referring to FIG. 4, the electronic device 400 includes a transceiving unit 410, a contact type ultrasonic transducer (for example, an enclosed type ultrasonic transducer) 416, a speaker 417, a microphone 418, a touch screen 420, a camera module 430, a memory 440, and a processor 450. The speaker 417 and the microphone 418 may be configured operate as a non-contact type ultrasonic transducer (for example, a resonant type ultrasonic transducer) in addition to a general audio module function. In this case, the heterogeneous ultrasonic transducers may be configured as ultrasonic input/output units of the electronic device 400. The processor 450 may perform the same functions as that of the processor 120 of FIG. 1 and the processor 210 of FIG. 2. The elements illustrated in FIG. 4 are not essential, and the electronic device 400 may be implemented by more or fewer elements than the elements illustrated in FIG. 4.

The ultrasonic transceiving unit 410 includes an ultrasonic TX beamforming unit 411, a sound input/output unit 412, an ultrasonic RX beamforming unit 413, a switching unit 414, and an ultrasonic filter unit 415.

The ultrasonic TX beamforming unit 411 generates a pulse waveform of transmission ultrasonic waves (an ultrasonic transmission signal) under the control of the processor 450. The generated ultrasonic transmission signal may be output to the outside through the contact type ultrasonic transducer 416 and the non-contact type ultrasonic transducer (for example, the speaker 417).

The sound input/output unit 412 may generate a sound signal of an audible frequency band under the control of the processor 450. The generated sound signal of the audible frequency band may be output to the outside through the speaker 417. The speaker 417 outputs the ultrasonic transmission signal of the ultrasonic frequency band generated by the ultrasonic TX beamforming unit 411 and the sound signal of the audible frequency band generated by the sound input/output unit 412 together.

The ultrasonic filter unit 415 may filter an ultrasonic reception signal (e.g., reflected waves) among the signals received from the contact type ultrasonic transducer 416 and/or the non-contact type ultrasonic transducer (for example, the microphone 417) and provide the filtered ultrasonic reception signal to the ultrasonic RX beamforming unit 413. The ultrasonic RX beamforming unit 413 converts an analog signal passing through the ultrasonic filter unit 415 into a digital signal and transmits the received ultrasonic reception signal to the processor 450.

The switching unit (MUX & T/R switch) 414 is connected with all of the input/output devices including the microphone 418 and the heterogeneous ultrasonic transducers under the control of the processor 450, and transmits the transmission/reception signal to each part of an ultrasonic transceiving unit.

The processor 450 controls the switching unit 414 so that the ultrasonic transmission signal generated by the ultrasonic TX beamforming unit 411 is transmitted only to the non-contact type ultrasonic transducer (for example, the speaker 417) at an initial stage. The processor 450 controls the switching unit 414 so that the ultrasonic RX beamforming unit 413 receives only the ultrasonic reception signal received from the microphone 418. When it is detected that an object approaches the electronic device 400, that is, total reflection is detected, by the ultrasonic waves (reflected waves) received by the microphone 418, the processor 450 controls the switching unit 414 so that the ultrasonic transmission signal emitted by the ultrasonic TX beamforming unit 411 is blocked from being transmitted to the speaker 417 (the non-contact type ultrasonic transducer), and the ultrasonic transmission signal is transmitted only to the contact type ultrasonic transducer 416. In this case, the processor 450 controls the switching unit 414 so that only the ultrasonic reception signal received from the contact type ultrasonic transducer 416 is received through the ultrasonic RX beamforming unit 413. In this case, processor 450 controls the switching unit 414 so that the sound signal of the audible frequency band generated by the sound input/output unit 412 is transmitted through the speaker 417, and only an external sound signal of an audible frequency band is received through the microphone 418. However, the present disclosure is not limited thereto, according to a function setting, the processor 450 may make a control so that the ultrasonic transmission signal generated by the ultrasonic TX beamforming unit 411 is simultaneously transmitted to the contact type ultrasonic transducer 416 and the non-contact type ultrasonic transducer 417, and the ultrasonic reception signal is simultaneously received through the contact type ultrasonic transducer 416 and the microphone 418.

The processor 450 controls the ultrasonic transceiving unit 410 to transmit the ultrasonic transmission signal through the contact type ultrasonic transducer 416 and the speaker or receive the ultrasonic reception signal through the microphone 418 or the contact type ultrasonic transducer 416. In this case, the processor 450 transmits a control signal through the MUX & T/R switch for controlling an input/output path and transmits the transmission signal to the ultrasonic TX beamforming unit 411, or receives the reception signal from the ultrasonic RX beamforming unit 413. The processor 450 generates a sound signal to be output by controlling the sound input/output unit 412 in order to transmit the sound signal to the non-contact type ultrasonic transducer (the speaker 417), and outputs a transmission sound signal through the speaker 417 together with the ultrasonic transmission signal generated by the ultrasonic TX beamforming unit 411 through the MUX.

The processor 450 controls the heterogeneous ultrasonic transducers to be mutually/exclusively operated. For example, the processor 450 detects a proximity of an object relative the electronic device 400 by using the ultrasonic reception signal (reflected waves) received through the non-contact type ultrasonic transducer (for example, the microphone 418), and recognizes a kind of contact (or super-proximity) medium (object) by operating the contact type ultrasonic transducer 416. As used herein super-proximity is defined as an object that is very close to the electronic device 400. The processor 450 recognizes a flooding situation according to the kind of medium, and controls various functions of the electronic device 400 in preparation of the flooding situation. As noted above, a flooding situation occurs when the electronic device 400 is in contact with water. For example, when the processor 450 recognizes the flooding situation, the processor 450 turns off a power supply of the electronic device 400 to protect an internal circuit and electronic components of the electronic device 400. When the electronic device 400 has a waterproofing function, the processor 450 performs an input function by using the contact type ultrasonic transducer 416. The processor 450 may also execute at least one function of the electronic device 400 according to a contact of the contact type ultrasonic transducer 416 to a human body in water. The corresponding function may include at least one of various functions including camera mode entrance, image capturing, volume up/down, switching from a sleep mode to an idle mode, and turning-off of the power supply.

The processor 450 may activate the contact type ultrasonic transducer 416 according to a setting of the electronic device 400 and control the contact type ultrasonic transducer 416 to be utilized as a key button or a sensor for recognizing a gesture. The processor 450 may make a control so as to promote a switch to an idle mode according to proximity of an object relative to the electronic device 400 by activating the contact type ultrasonic transducer 416 and/or the non-contact type ultrasonic transducer 417 and emitting ultrasonic waves in accordance with a predetermined wake up period in a sleep state of the electronic device 400.

The processor 450 may make a control so that when the electronic device 400 is a component of a mobile terminal for communication, the contact type ultrasonic transducer 416 is configured as a proximity sensor. When the processor 450 detects an initiation of a call of the electronic device 400, the processor 450 activates the contact type ultrasonic transducer 416 and controls the contact type ultrasonic transducer 416 to be operated as a proximity sensor.

The touch screen 420 represents an input/output device capable of simultaneously performing an input function and a display function, and may include a display 421 and a touch detecting unit 422. The touch screen 420 provides an input/output interface between the electronic device 400 and a user, and serves as a medium capable of transmitting a touch input of the user to the electronic device 400, and displaying an output from the electronic device 400 to the user. The touch screen 420 displays a visual output to the user. The visual output may be displayed in a form of text, graphic, video, or a combination thereof.

The display 421 displays (outputs) various elements of information processed by the electronic device 400. For example, the display 421 may display a user interface (UI) or a GUI related to an operation performed by the electronic device 400 during charging or an operation of performing data communication according to a connection with a USB interface.

The touch detecting unit 422 may be disposed in such a manner so as to overlap the display 421, and detect a user input that is in contact with or approaches a surface of the touch screen 420. The user input may include a touch event or proximity even input based on at least one of a single-touch, a multi-touch, hovering, and an air gesture.

When the processor 450 recognizes a flooding situation of the electronic device 400 by using the heterogeneous ultrasonic transducers, the processor 450 inactivates the touch detecting unit 422 in order to prevent the touch detecting unit 422 from being erroneously operated. In this case, as long as the power supply is not turned off, the display 421 may control to perform a corresponding function while maintaining an activated state.

The camera module 430 represents an element supporting a photographing function of the electronic device 400. The camera module 430 photographs a predetermined subject under the control of the processor 450, and transmits photographed data (for example, an image) to the display 421. One or more camera modules 430 may be disposed at various positions at which photographing is available.

The memory 440 stores one or more programs executed by the processor 450, and temporarily stores input/output data. The input/output data may include files, for example, video, an image, or a picture. The memory 430 serves to store obtained data, and data obtained in real time may be stored in a temporary storage device, and data determined to be stored may be stored in a storage device capable of storing data for a long time.

The memory 440 may include a mapping table, in which the kind of medium detected by the contact type ultrasonic transducer 416 and a reflection coefficient corresponding to the kind of medium are stored. The processor 450 compares a reflection coefficient related to a medium detected by the ultrasonic RX beamforming unit 413 based on the ultrasonic reception signal received by the contact type ultrasonic transducer 416 with the mapping table stored in the memory 440 to confirm the medium corresponding to the corresponding reflection coefficient, and controls a function of the electronic device 400 related to the confirmed medium.

The processor 450 operates the camera module 430 automatically or through an instruction in a flooding situation of the electronic device 400 having a waterproofing function. In this case, the processor 450 may make a control so that the contact type ultrasonic transducer 416 is used as a key button for capturing an image.

Figure 5:
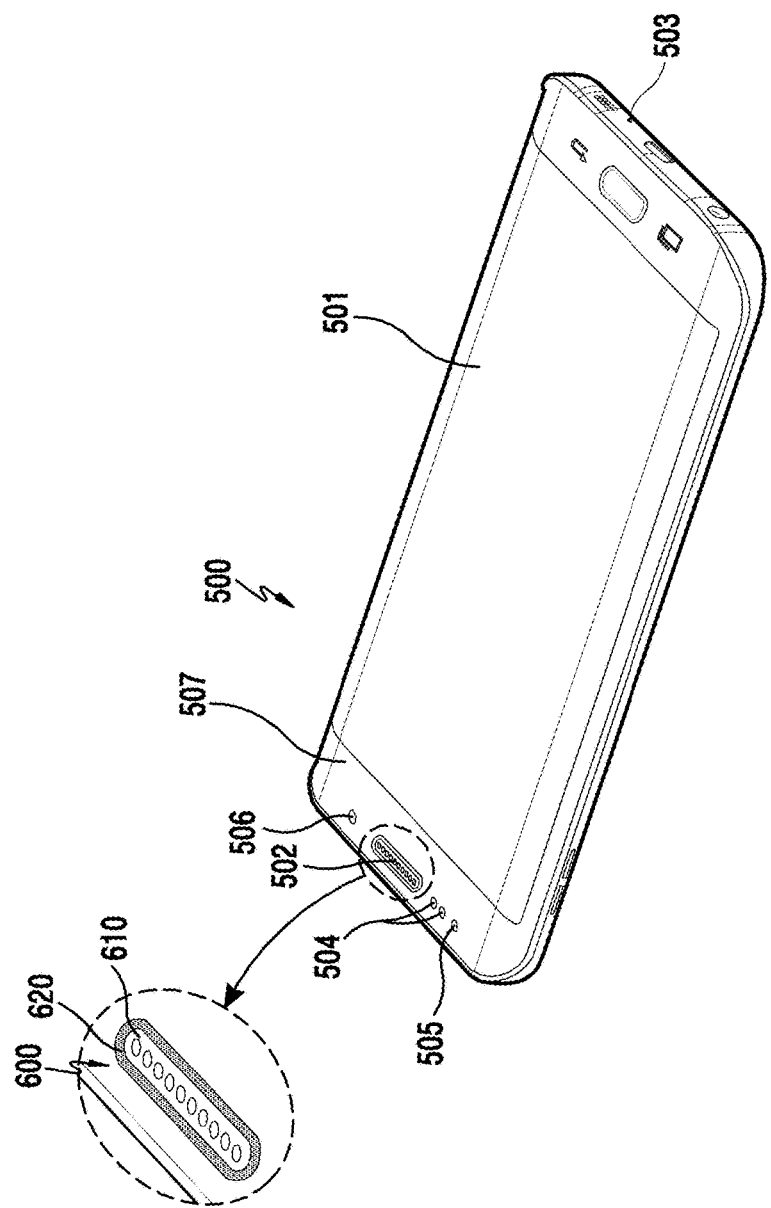
FIG. 5 is a perspective view of an electronic device including heterogeneous ultrasonic transducers, according to an embodiment of the present disclosure.

FIG. 5 is a perspective view of an electronic device 500 including heterogeneous ultrasonic transducers, according to an embodiment of the present disclosure. The electronic device 500 may include all or some of the components of the electronic device 101 of FIG. 1, the electronic device 201 of FIG. 2, and/or the electronic device 400 of FIG. 4.

Referring to FIG. 5, a front surface of the electronic device 500 may be formed as or include a window 507. A display 501 may be disposed in a partial region of the window 507 of the electronic device 500. A speaker device 502 for outputting an audio signal may be installed at an upper side of the display 501. The speaker device 502 may be configured to function as a non-contact type ultrasonic transducer 610 among heterogeneous ultrasonic transducers 600. A plurality of sensor modules 504 may be disposed at one side of the speaker device 502. The plurality of sensor modules 504 may include a sensor module, such as a luminance sensor 240$k$, a proximity sensor 240G and an ultrasonic sensor 240N, as described with reference to FIG. 2. An indicator 505 for providing a user with state information of the electronic device 500 may be disposed at one side of the sensor module 504. A camera 506 may be disposed at the other side of the speaker device 502. The camera device 506 may be disposed on the front surface of the electronic device 500 to function as a front camera device. A microphone 503 for transmitting, during a call, a voice of a user of the electronic device 500 to another electronic device, e.g., electronic devices 102, 104, may be further disposed at a lower side of the display 501.

The heterogeneous ultrasonic transducers 600 of the electronic device 500 may be disposed on the front surface thereof. The heterogeneous ultrasonic transducers 600 include the non-contact type ultrasonic transducer 610 and a contact type ultrasonic transducer 620. The non-contact type ultrasonic transducer 610 among the heterogeneous ultrasonic transducer 600 may be exposed from the front surface of the electronic device 500 in order to perform a function of transmitting or receiving a signal of an ultrasonic band and a function for transmitting or receiving a sound of an audible frequency band together. The non-contact type ultrasonic transducer 610 may be used as the speaker device 502 of the electronic device 500. The contact type ultrasonic transducer 620 is visible from the front surface of the electronic device 500 so that a user may recognize the contact type ultrasonic transducer 620 as described above, or disposed at a rear surface of the window 507 so as not to be visible to a user. However, the contact type ultrasonic transducer 620 is not limited thereto, and the contact type ultrasonic transducer 620 may be disposed so its location is recognizable to a user.

The contact type ultrasonic transducer 620 may be disposed around the non-contact type ultrasonic transducer 610 so as to surround a boundary of the non-contact type ultrasonic transducer 610, as illustrated in FIG. 5. However, the contact type ultrasonic transducer 620 is not limited thereto, and one or more contact type ultrasonic transducers 620 may also be disposed around the non-contact type ultrasonic transducer 610 at a predetermined interval.

The non-contact type ultrasonic transducer 610 is operable at an initial state of the electronic device 500, and when proximity of an object (for example, a human body or a liquid) is detected by the non-contact type ultrasonic transducer 610. The initial state indicates a state that no object is detected by the electronic device. When the proximity of the object is detected, the electronic device 500 activates the contact type ultrasonic transducer 620 to accurately confirm or determine the kind/type of contact object (medium, e.g., air, water, etc.). The electronic device 500 may perform a corresponding function according to the kind of contact object, as will be described in greater detail below.

The electronic device 500 activates at least one of the contact type ultrasonic transducer 620 and the non-contact type ultrasonic transducer 610 according to a change of a setting. For example, the electronic device 500 may perform a key input function and/or a gesture input function by using the contact type ultrasonic transducer 620, as will be described in greater detail below.

Figure 6A:
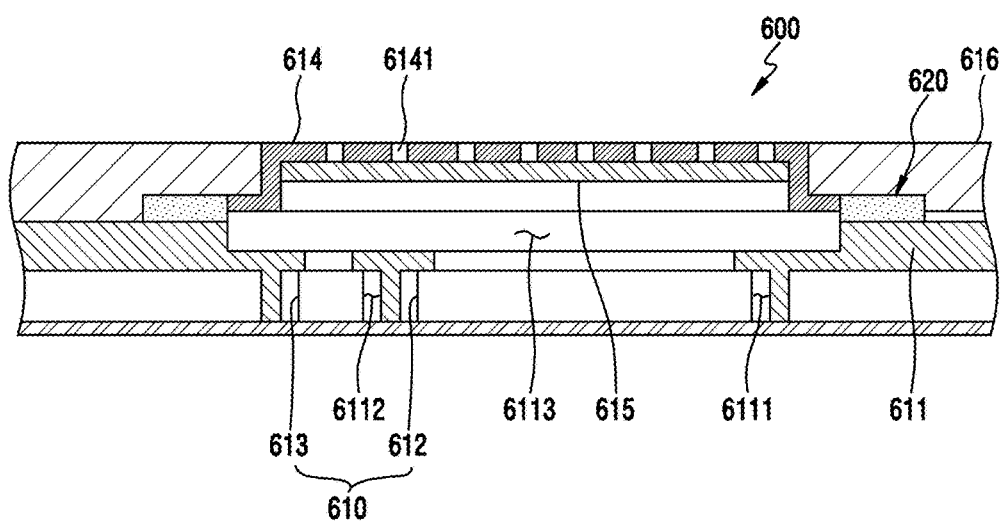
FIG. 6A is a cross-sectional view of a main part of an electronic device including heterogeneous ultrasonic transducers, according to an embodiment of the present disclosure.
Figure 6B:
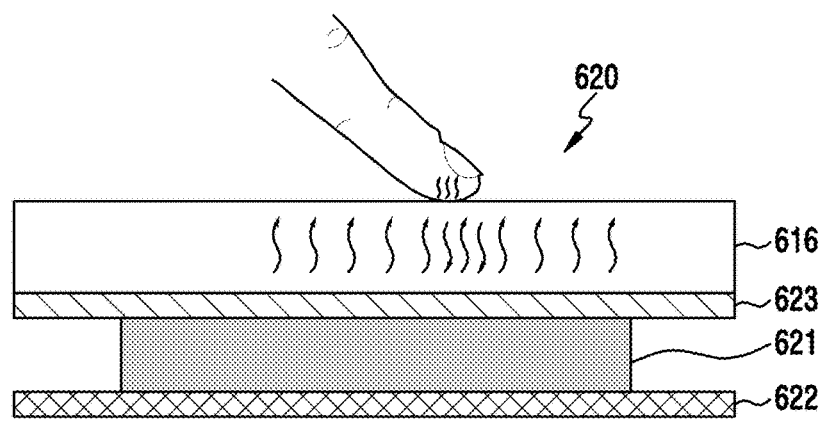
FIG. 6B is a partial cross-sectional view of a contact-type ultrasonic transducer (e.g., an enclosed type ultrasonic transducer), according to an embodiment of the present disclosure.
Figure 6C:
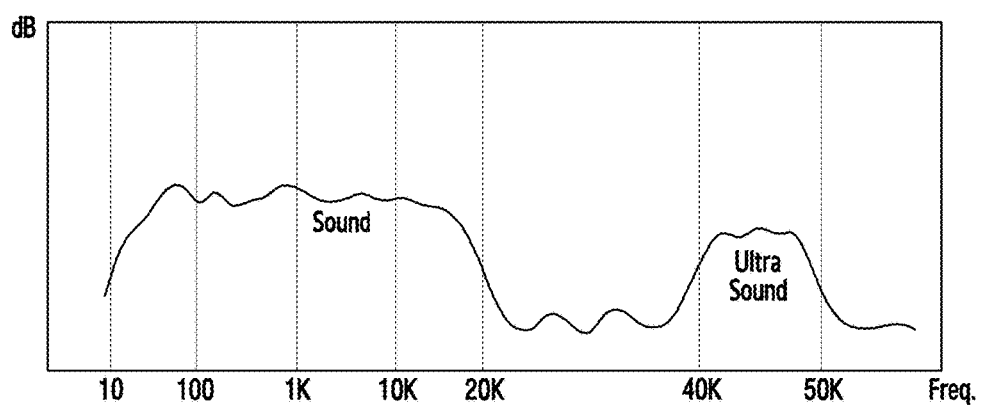
FIG. 6C is a graph illustrating a frequency characteristic of a non-contact type ultrasonic transducer (e.g., a resonant type ultrasonic transducer), according to an embodiment of the present disclosure.

FIG. 6A is a cross-sectional view of a main part of the electronic device 500 including the heterogeneous ultrasonic transducers 600, according to an embodiment of the present disclosure, FIG. 6B is a partial cross-sectional view of a contact-type ultrasonic transducer (e.g., an enclosed type ultrasonic transducer), according to an embodiment of the present disclosure, and FIG. 6C is a graph illustrating a frequency characteristic of a non-contact type ultrasonic transducer (e.g., a resonant type ultrasonic transducer), according to an embodiment of the present disclosure.

Referring to FIG. 6A, the heterogeneous ultrasonic transducers 600 includes a non-contact type ultrasonic transducer 610, which may include a speaker module 612 disposed in a speaker module installation space 6111 provided in a housing 611 of the electronic device 500, and a microphone 613 disposed in a microphone installation space 6112 provided in a housing 611 of the electronic device 500.

The non-contact type ultrasonic transducer 610 may include the speaker module 612 for outputting an ultrasonic signal, and the non-contact type ultrasonic transducer 610 may include the microphone 613 for detecting an ultrasonic reception signal, which is an ultrasonic transmission signal output from the speaker module 612 and reflected by an object. The speaker module 612 may use a voice coil, but is not limited thereto. For example, in order to miniaturize the speaker module 612, a speaker module of a micro electro mechanical system (MEMS) type may also be used.

The speaker module 612 may be configured as an ultrasonic transmitter for outputting an ultrasonic transmission signal of an ultrasonic frequency band (for example, a signal of a frequency band of 40 KHz to 50 KHz, as illustrated in FIG. 6C) generated by an ultrasonic wave TX beamforming unit under a control of the electronic device 500. The speaker module 612 may simultaneously output a sound signal of an audible frequency band (for example, a signal of a frequency band of 10 KHz to 20 KHz, as illustrated in FIG. 6C) generated by a sound input/output unit together with an ultrasonic transmission signal. The microphone 613 may be configured as an ultrasonic receiver for receiving an ultrasonic reception signal (reflected waves), which is an ultrasonic transmission signal output from the speaker module 612 and reflected from an object outside of the electronic device 500. The microphone 613 may receive an external sound of the audible frequency band.

A speaker resonance space 6113 may be provided in a corresponding region at an upper side of the housing 611, in which the speaker module 612 is disposed. A window 616 may be installed at an upper side of the speaker resonance space 6113. The window 616 may be fixed to the housing 611. A speaker grill 614 may be installed at a portion of the housing 611 corresponding to the speaker module 612 of the window 616. The speaker grill 614 may be provided with a plurality of emitting holes 6141 for allowing the ultrasonic transmission and reception signals and the sound signal output from the speaker module 612 to pass through. The plurality of emitting holes 6141 may be configured as holes for transmitting an external sound to the microphone 613. Accordingly, the emitting holes 6141 may be configured to allow the ultrasonic transmission and reception signals and the input/output sound of the audible frequency band of the speaker module 612 and the microphone 613 to pass through at the same time.

The contact type ultrasonic transducer 620 may be disposed around the non-contact type ultrasonic transducer 610. The contact type ultrasonic transducer 620 may be disposed so as to surround a boundary of the non-contact type ultrasonic transducer 610, as described above. However, the contact type ultrasonic transducer 620 is not limited thereto, and one or more contact type ultrasonic transducers 620 may also be disposed around the non-contact type ultrasonic transducer 610 at a predetermined interval. The contact type ultrasonic transducer 620 may be disposed between the housing 611 and the window 616 The contact type ultrasonic transducer 620 may be disposed so it is visible from the outside of the window 616, or it may be disposed so that it is not visible from the outside of the window 616. When the contact type ultrasonic transducer 620 is not visible, in the contact type ultrasonic transducer 620, a separate indicator, of which a position may be intuitively recognized, may be carved in an external surface of the window 616. A waterproofing mesh 615 for preventing foreign substances or water from entering through the speaker emitting holes 6141 and permeating the housing 611 may be further disposed on a lower surface of the speaker grill 614.

Referring to FIG. 6B, a matching layer 623 and a sound adsorbing layer 622 may be disposed with a piezoelectric element (PE) layer 621, that is, a piezoelectric element interposed therebetween. The matching layer 623 may be contributed as an attachment layer capable of fixing the PE layer to the window 616, and the sound adsorbing layer 622 may be disposed in the housing 611 of the electronic device 500. The PE layer 621 may serve as a support layer so as to prevent separation from the surface of the housing 611, and may be formed of a material having a high reflection coefficient, which prevents the emitted ultrasonic waves from being transmitted into the electronic device 500 and allows the emitted ultrasonic waves to be emitted only to the outside of the electronic device 500 to prevent interference.

The non-contact type ultrasonic transducer 610 emits the ultrasonic transmission signal through the speaker module 612, and receives an ultrasonic reception signal reflected from an object that is proximate (or super-proximate) relative to the electronic device 500 from the outside through the microphone 613, and detects total reflection.

The contact type ultrasonic transducer 620 emits the ultrasonic transmission signal, performs total reflection in a general air environment, and receives ultrasonic reception signals having different reflection coefficients according to the kind of medium that is in contact with a corresponding position of the window 616.

The electronic device 500 detects total reflection for the object, from which the ultrasonic signal is reflected, by operating only the non-contact type ultrasonic transducer 610 at an initial stage. When the total reflection is detected, the electronic device 500 detects the kind of contact object (medium) by activating the contact type ultrasonic transducer 620. The electronic device 500 calculates a reflection coefficient for the ultrasonic reception signal received from the contact type ultrasonic transducer 620 and performs a predetermined function by determining the kind of medium corresponding to the calculated reflection coefficient.

Figure 7A:
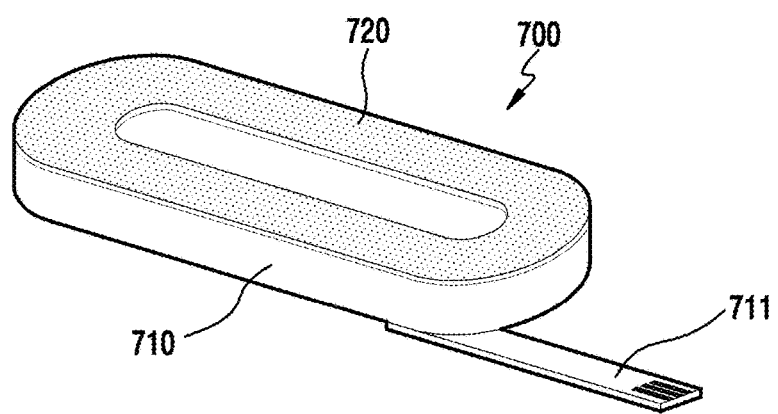
FIG. 7A is a perspective view of a heterogeneous ultrasonic transducer including a speaker module including a contact type ultrasonic transducer, according to an embodiment of the present disclosure.

FIG. 7A is a perspective view of a heterogeneous ultrasonic transducer 700 including a speaker module 710 including a contact type ultrasonic transducer 720, according to an embodiment of the present disclosure.

Referring to FIG. 7A, the contact type ultrasonic transducer 720 may be directly attached onto an upper surface of the speaker module 710, unlike the aforementioned configuration of the contact type ultrasonic transducer 620. In this case, the contact type ultrasonic transducer 720 extends out from the speaker module 710 and may also be electrically connected to a printed circuit board (PCB) by using a connector member 711 (for example, a flexible PCB (FPCB)) for electrically connecting the contact type ultrasonic transducer 720 to the PCB of the electronic device 500. In this case, the electronic device 500 is not provided with a separate installation space for the contact type ultrasonic transducer 720, thereby contributing to a slim electronic device 500.

Figure 7B:
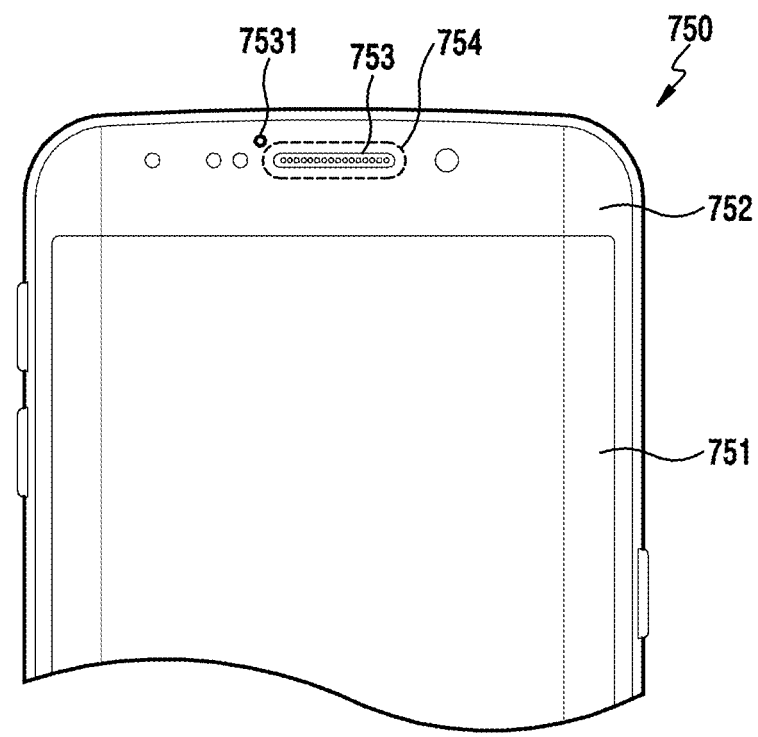
FIG. 7B is a diagram illustrating a mounted position of a microphone of an electronic device, according to an embodiment of the present disclosure.

FIG. 7B is a diagram illustrating a mounted position of a microphone 7531 of the electronic device 750, according to an embodiment of the present disclosure.

Referring to FIG. 7B, the electronic device 750 may include a display 751 in a partial region of a window 752. A speaker module 753 may be disposed in a partial region of the window 752. A contact type ultrasonic transducer 754 may be disposed around the speaker module 753. The microphone 7531 for receiving an ultrasonic reception signal, which is an ultrasonic transmission signal output from the speaker module 753 and reflected by an external object, may be spaced from the speaker module 753 at a predetermined distance. The microphone 7531 may be disposed around an external side of the contact type ultrasonic transducer 754. In this case, the microphone 7531 may be installed on the same surface as a surface on which the speaker module 753 is installed. This is for the purpose of smoothly receiving the ultrasonic reception signal, which is the ultrasonic transmission signal output from the speaker module 753 and reflected from an object.

Figure 8A:
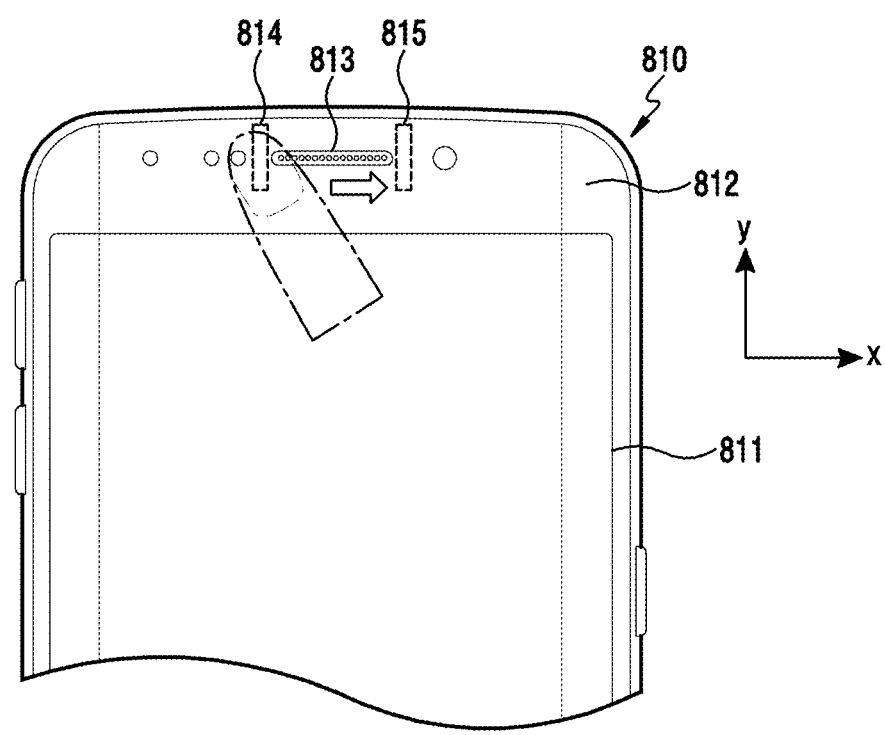
FIGS. 8A-8C are diagrams illustrating various disposition states of a contact type ultrasonic transducer of an electronic device, according to an embodiment of the present disclosure.
Figure 8B:
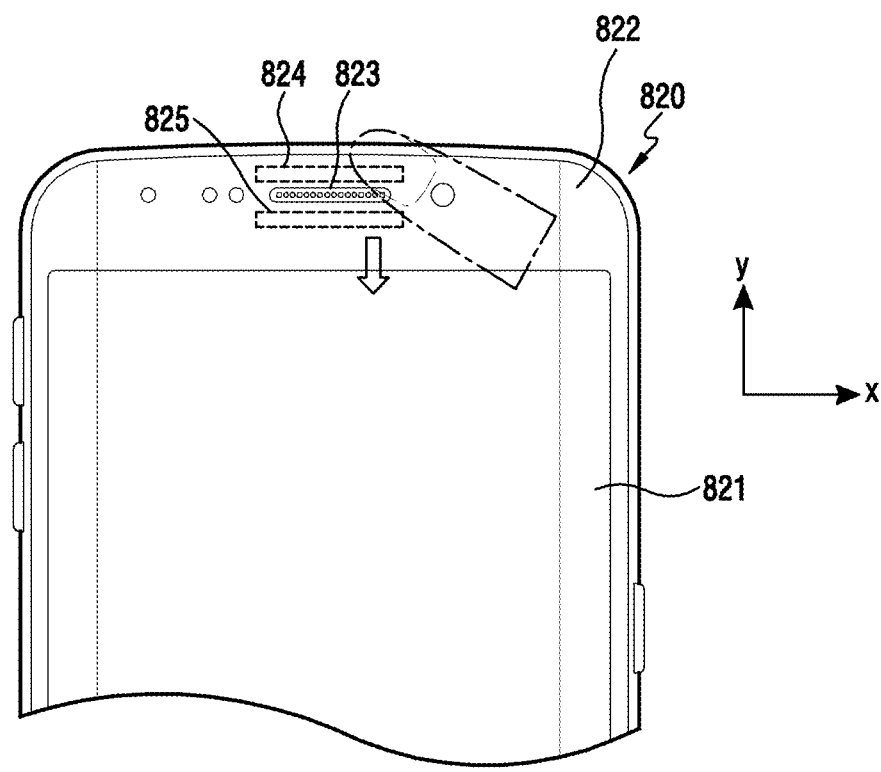
Figure 8C:
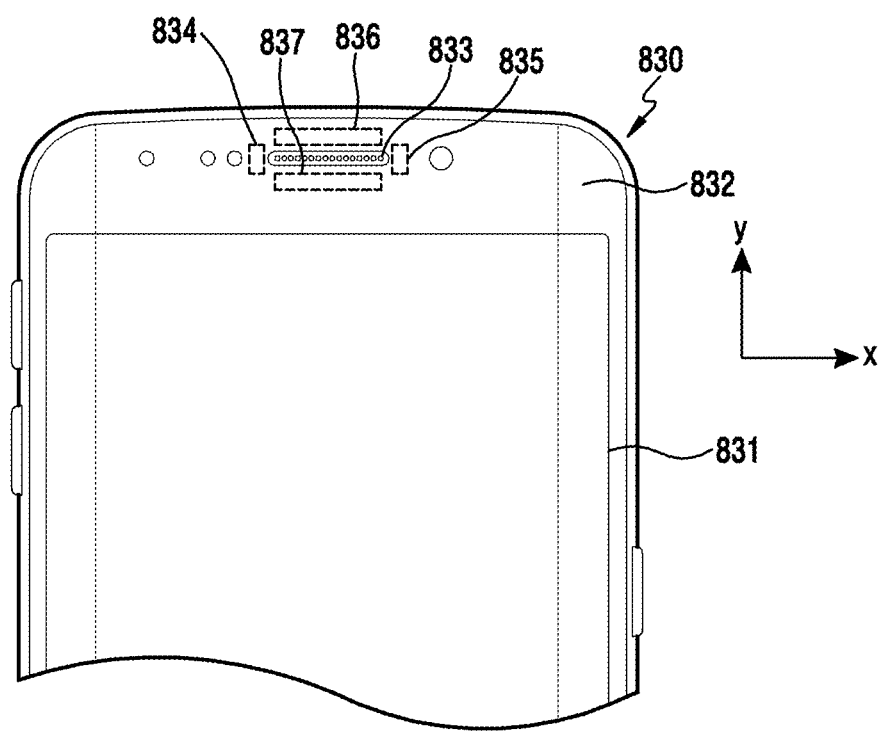

FIGS. 8A-8C are diagrams illustrating various disposition states of a contact type ultrasonic transducer of an electronic device 810, according to an embodiment of the present disclosure.

Referring to FIGS. 8A-8C, at least two contact type ultrasonic transducers may be installed to perform various functions corresponding to a gesture of a contact object (for example, a gesture of a finger). When the electronic device 810 detects a flooding environment, the electronic device 810 detects a gesture of an object even in the flooding environment by using the contact type ultrasonic transducer and performs a corresponding function. For example, the electronic device 810 recognizes a gesture through reflected waves according to the gesture of a user on a z-axis. That is, when the gesture is close to the contact type ultrasonic transducer on the z-axis, a real time of the reflected waves is gradually decreased. By using such a configuration, the contact type ultrasonic transducer may be utilized as a virtual button in a flooding environment. The contact type ultrasonic transducer may be controlled so as to perform the aforementioned function in a general environment in addition to the flooding environment.

Referring to FIG. 8A, the electronic device 810 includes a display 811 which is disposed in a region of a window 812. A pair of contact type ultrasonic transducers 814 and 815 may be disposed in a region of the window 812 at left and right sides of a speaker module 813, respectively. In this case, when a user performs a drag motion from a left side to a right side in a state where a finger of the user is in contact with (or super-proximate to, e.g., hovering over) the window 812, the electronic device 810 uses the contact type ultrasonic transducers 814 and 815 to detect the drag to perform a corresponding set function. However, the electronic device 810 is not limited thereto, and when the electronic device 810 detects a contact of the finger of the user to the contact type ultrasonic transducer 814 disposed at the left side, and then detects a contact of the finger of the user to the contact type ultrasonic transducer 815 disposed at the right side within a predetermined time, the electronic device 810 may also make a control so that a corresponding function may be performed. In this case, the electronic device 810 may set the same function to be performed by two consecutive touches, not a drag, when it is detected that the contact type ultrasonic transducer 814 disposed at the left side and the contact type ultrasonic transducer 815 disposed at the right side are sequentially contacted. However, the electronic device 810 is not limited thereto, and when it is detected that the contact type ultrasonic transducer 814 disposed at the left side and the contact type ultrasonic transducer 815 disposed at the right side are sequentially contacted, the electronic device 810 may also recognize the sequential contacts as a drag. When it is detected that the contact type ultrasonic transducer 814 disposed at the left side and the contact type ultrasonic transducer 815 disposed at the right side are simultaneously contacted, the electronic device 810 may also recognize the simultaneous contacts as a multi-touch.

Referring to FIG. 8B, an electronic device 820 may include a display 821 in a region of a window 822. A pair of contact type ultrasonic transducers 824 and 825 may be disposed in regions of the window 822. The contact type ultrasonic transducers 824 and 825 may be disposed at upper and lower sides of a speaker module 823, respectively. In this case, when a user performs a drag motion from an upper side to a lower side in a state where a finger of the user is in contact with (or super-proximate to) the window 822, the electronic device 820 may use the contact type ultrasonic transducers 824 and 825 to detect the drag to perform a predetermined corresponding function. However, the electronic device 820 is not limited thereto, and when the electronic device 820 detects a contact of the finger of the user to the contact type ultrasonic transducer 824 disposed at the upper side, and then detects a contact of the finger of the user to the contact type ultrasonic transducer 825 disposed at the lower side within a predetermined time, the electronic device 820 may also make a control so that a corresponding function may be performed. In this case, the electronic device 820 may set the same function to be performed by two consecutive touches, not a drag, when it is detected that the contact type ultrasonic transducer 824 disposed at the upper side and the contact type ultrasonic transducer 825 disposed at the lower side are sequentially contacted. However, the electronic device 820 is not limited thereto, and when it is detected that the contact type ultrasonic transducer 824 disposed at the upper side and the contact type ultrasonic transducer 825 disposed at the lower side are sequentially contacted, the electronic device 820 may also recognize the sequential contacts as a drag. When it is detected that the contact type ultrasonic transducer 824 disposed at the upper side and the contact type ultrasonic transducer 825 disposed at the lower side are simultaneously contacted, the electronic device 820 may also recognize the simultaneous contacts as a multi-touch.

Referring to FIG. 8C, an electronic device 830 may include a display 831 in a region of a window 832. Four contact type ultrasonic transducers 834, 835, 836, and 837 may be disposed in regions of the window 832. The contact type ultrasonic transducers 834, 835, 836, and 837 may be disposed at left, right, upper, and lower sides of a speaker module 833, respectively. In this case, when a user performs a drag motion from a left side to a right side, from the right side to the left side, from an upper side to a lower side, and from the lower side to the upper side in a state where a finger of the user is in contact with the window 832, or performs a contact motion with a predetermined time interval, the electronic device 830 may make the contact type ultrasonic transducers 834, 835, 836, and 837 to detect the drag motion or the touch motion to perform a predetermined corresponding function.

Figure 9:
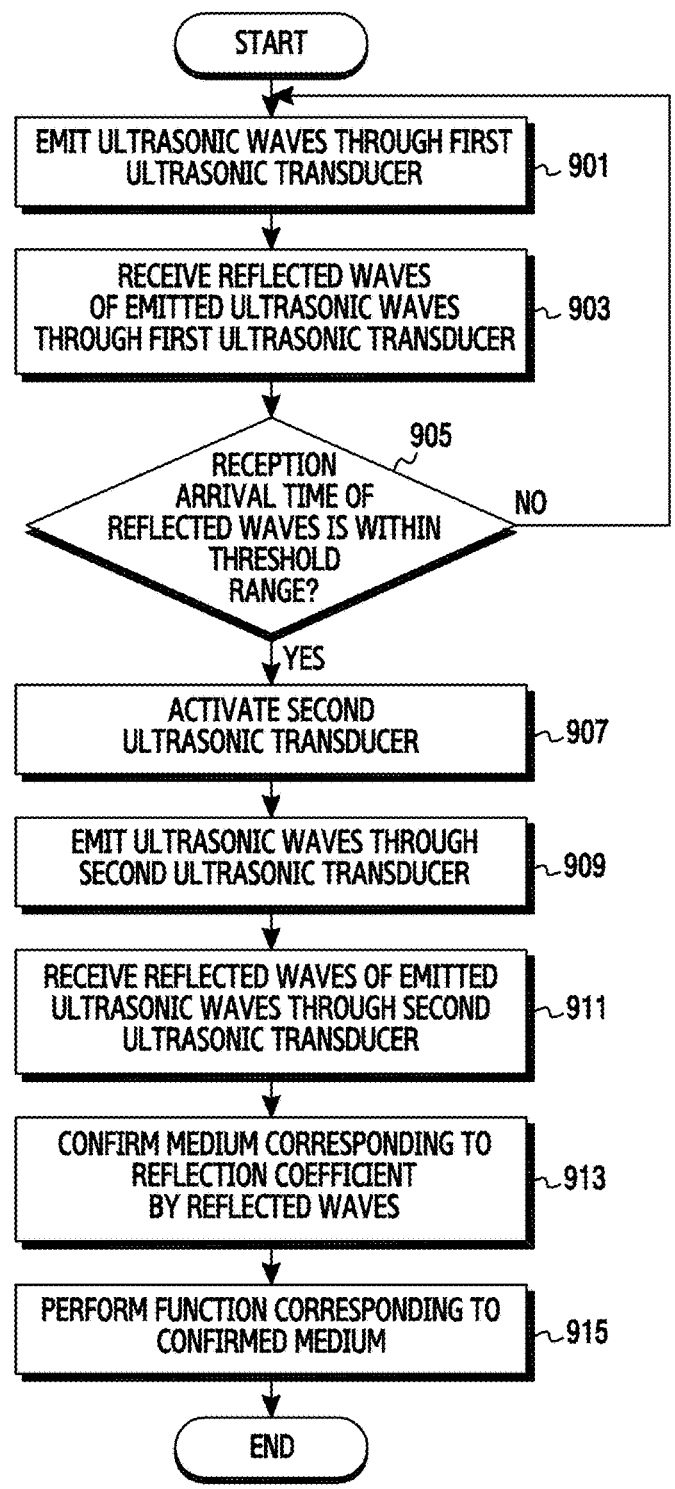
FIG. 9 is a flowchart illustrating a method of recognizing a surrounding environment by using heterogeneous ultrasonic transducers, according to an embodiment of the present disclosure.

FIG. 9 is a flowchart illustrating a method of recognizing a surrounding environment by using heterogeneous ultrasonic transducers, according to an embodiment of the present disclosure. In describing FIG. 9, the configurations of FIGS. 4-6C will be referred to.

Referring to FIG. 9, in step 901, an electronic device (for example, a processor of one of the aforementioned electronic devices) emits ultrasonic waves through a first ultrasonic transducer. The first ultrasonic transducer may include a non-contact type ultrasonic transducer. The non-contact type ultrasonic transducer may be a resonant ultrasonic transducer. The non-contact type ultrasonic transducer may include, for example, the speaker module 612 of FIG. 6A. In this case, an ultrasonic transmission signal generated by the speaker module 612 may be emitted to the outside of the electronic device through the speaker grill 614.

In step 903, the electronic device receives reflected waves, which are the ultrasonic waves emitted through the first ultrasonic transducer and reflected by an object. The ultrasonic waves reflected by the object may be received in the microphone 616 of FIG. 6A, converted into a digital signal through the ultrasonic RX beamforming unit 413, and provided to the processor 450. The object may be a human body approaching the electronic device from the outside of the electronic device. The object may be a liquid (for example, water) exposed at the outside of the electronic device.

In step 905, the electronic device determines whether a reception arrival time of the reflected waves is within a threshold range. When the reflected waves arrive within the predetermined threshold time range, the electronic device recognizes total reflection, in which the object approaches the electronic device.

In step 907, when the electronic device recognizes the total reflection by the first ultrasonic transducer, the electronic device activates a second ultrasonic transducer. In this case, the electronic device may inactivate the first ultrasonic transducer. However, the present disclosure is not limited thereto, and the electronic device may continuously maintain a state in which only an ultrasonic transceiving function of the first ultrasonic transducer is inactivated, and a function of transmitting/receiving a sound of an audible frequency band is activated. The second ultrasonic transducer may be a contact type ultrasonic transducer for detecting a kind of object which is in contact with (or super-proximate to) the electronic device. The contact type ultrasonic transducer may be an enclosed type transducer.

In step 909, the electronic device emits ultrasonic waves through the second ultrasonic transducer. In this case, the electronic device generates an ultrasonic pulse waveform through the ultrasonic TX beamforming unit 411 and provides the generated ultrasonic pulse waveform to the second ultrasonic transducer.

In step 911, the electronic device receives reflected waves of the ultrasonic waves emitted through the second ultrasonic transducer. The second ultrasonic transducer receives reflected waves having different reflection coefficients according to the kind of contact (or super-proximate) object.

In step 913, the electronic device may confirm the object (medium) corresponding to the reflection coefficient by the reflected waves. The electronic device recognizes the kind of object that is currently in contact (or super-proximate) by using a mapping table, in which a corresponding medium is matched to a reflection coefficient, stored in a memory. When the medium is air, for example, the ultrasonic waves are reflected 99.9% by a known reflection coefficient formula, but when a human body (tissue) is in contact with (or super-proximate) to the electronic device, the ultrasonic waves are reflected 0.08% by a known reflection coefficient formula, so that the electronic device may determine the kind of medium by using a difference of the generated reflection coefficients.

In step 915, the electronic device performs a function corresponding to the confirmed kind of medium. If the electronic device recognizes a flooding situation of the electronic device according to the kind of medium, and the electronic device controls various functions thereof in preparation of the flooding situation. For example, when the electronic device recognizes a flooding situation, the electronic device protects an internal circuit by turning off a power supply of the electronic device. When the electronic device has a waterproofing function, the electronic device may recognize a contact (or super-proximate) state of the second ultrasonic transducer to perform an input function. In this instance, the electronic device executes one or more functions of the electronic device according to the contact of the human body to the contact type ultrasonic transducer in water. The corresponding function may include at least one of various functions including camera mode entrance, image capturing, volume up/down, switch from a sleep mode to an idle mode, and turning off the power supply.

The electronic device may make a control so that the second ultrasonic transducer is activated and operated as a key button or a sensor for recognizing a gesture, without a previous detection operation of the first ultrasonic transducer according to the setting of the electronic device. In this case, the first ultrasonic transducer maintains the inactivated state. The electronic device may switch to an idle mode according to a proximity of an object by activating the first ultrasonic transducer and/or the second ultrasonic transducer and emitting ultrasonic waves in accordance with a predetermined wake up period in a sleep state of the electronic device. The electronic device may make a control so that the second ultrasonic transducer is configured as a proximity sensor. When the electronic device detects a call initiation, the electronic device may make a control so that the second ultrasonic transducer is activated and contributed as a proximity sensor.

When the electronic device (for example, a smart phone) is laid on a surface of an object, the electronic device determines whether the electronic device is turned over by a user or the electronic device approaches the human body (for example, an ear) for a call by controlling the first ultrasonic transducer and the second ultrasonic transducer. In this case, the electronic device may operate all of the first and second ultrasonic transducers at an initial stage, and when the electronic device receives a call, the electronic device may operate at least one of the ultrasonic transducers. When the electronic device detects the detection by the first ultrasonic transducer and does not detect the detection by the second ultrasonic transducer, the electronic device recognizes that the electronic device is in a turned-over state on the surface of the object. When the electronic device detects the detection by the first ultrasonic transducer and then detects the detection by the second ultrasonic transducer, the electronic device determines that the electronic device approaches the human body of the user for a call.

Figure 10:
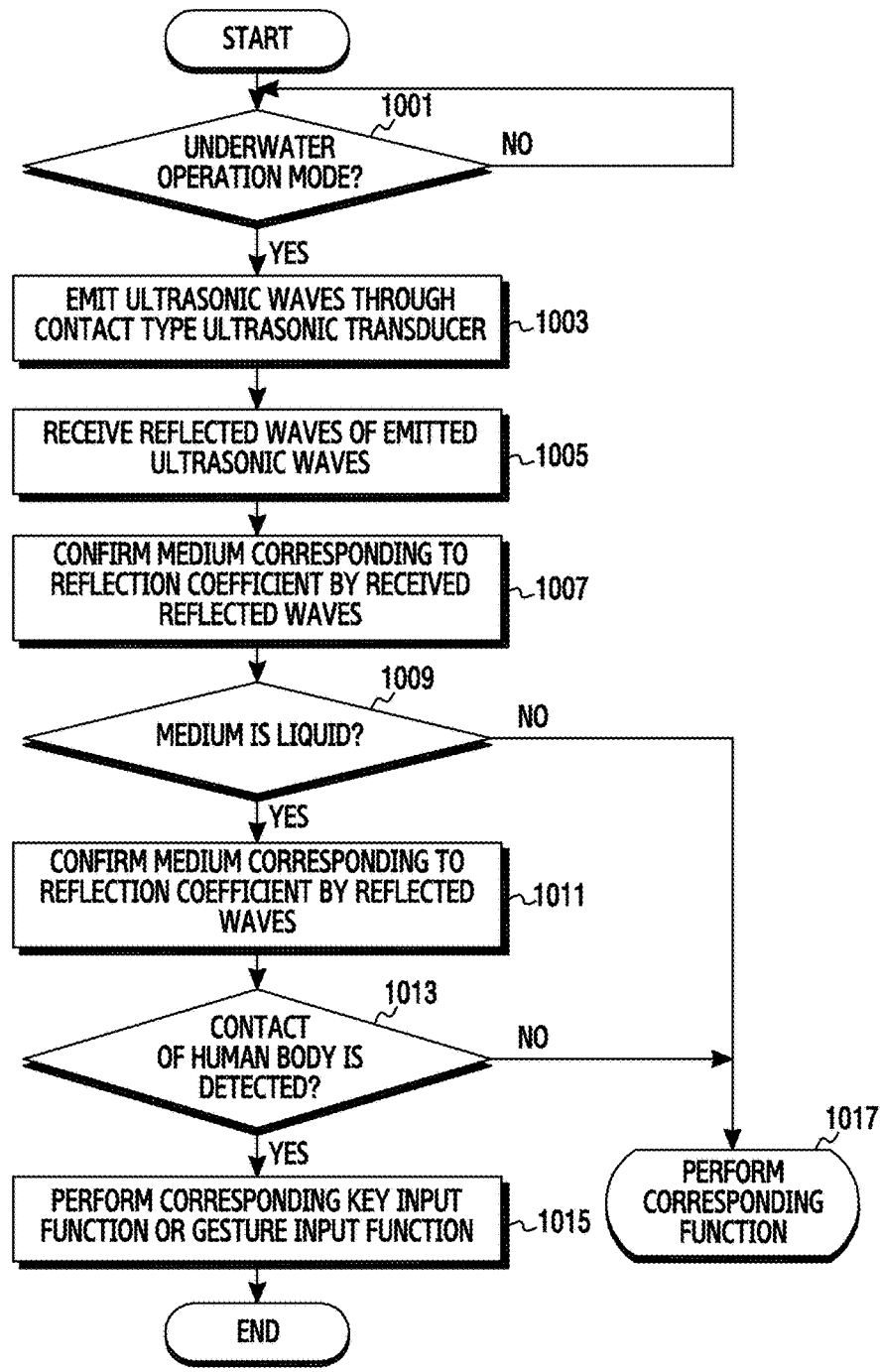
FIG. 10 is a flowchart illustrating a method of performing an input function in a flooding situation by using heterogeneous ultrasonic transducers, according to an embodiment of the present disclosure.

FIG. 10 is a flowchart illustrating a method of performing an input function in a flooding situation by using heterogeneous ultrasonic transducers, according to an embodiment of the present disclosure. In describing FIG. 10, the configurations of FIGS. 4-6C will be referred.

Referring to FIG. 10, in step 1001, an electronic device (for example, a processor of one of the aforementioned electronic devices) confirms whether the electronic device is set in an underwater operation mode. The electronic device may be an electronic device that has a waterproofing function.

In step 1003, when a current setting mode is the underwater operation mode (or a flooding detection mode), ultrasonic waves may be emitted through a contact ultrasonic transducer. A non-contact type ultrasonic transducer may include the speaker module 612 of FIG. 6A. In this case, an ultrasonic transmission signal generated by the speaker module 612 may be emitted to the outside of the electronic device through the speaker grill 614. That is, the electronic device determines the underwater mode based on an ultrasonic signal received through the non-contact type ultrasonic transducer, and when the setting mode is the underwater mode, the electronic device may make a control so that the contact type ultrasonic transducer is switched on and functional.

In step 1005, the electronic device receives reflected waves of the ultrasonic waves emitted through the contact type ultrasonic transducer. The contact type ultrasonic transducer receives reflected waves having different reflection coefficients according to the kind of object that it is in contact with (or super-proximate to).

In step 1007, the electronic device confirms the object (medium) corresponding to the reflection coefficient by the reflected waves. The electronic device recognizes the kind of object that it is currently in contact with (or super-proximate to) by using a mapping table, in which a corresponding medium is matched to a reflection coefficient, stored in a memory.

In step 1009, the electronic device confirms whether the medium that it is in contact with (or super-proximate to) is liquid by referring to the mapping table including the kind of medium corresponding to the reflection coefficient. When the medium is the liquid (for example, water) in step 1009, the electronic device performs step 1011. However, when the medium is not the liquid, the electronic device performs a corresponding function in step 1017. When the medium is not the liquid, the electronic device determines that the current situation is not a flooding situation and maintains a standby state.

In step 1011, when the medium is not the liquid, the electronic device confirms that the current situation is a flooding situation and confirms the object (medium) corresponding to the reflection coefficient by subsequent reflected waves. The electronic device confirms a reflection coefficient by the human body that is in contact with (or super-proximate to) the contact type transducer in the flooding situation in step 1013. For example, in step 1013, the electronic device determines whether the medium is a liquid or a human body.

In step 1015, when contact of a part of the human body is detected, the electronic device performs an input function by a user in the flooding situation. The input function may include a corresponding key input function or a gesture input function. The input function may include various functions, such as a camera executing function, an image capturing function, and a volume up/down function.

As can be appreciated by those of skill in the art, certain aspects of the present disclosure can also be embodied as computer readable code on a non-transitory computer readable recording medium. Accordingly, the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The module or programming module according to various embodiments of the present disclosure may further include at least one or more elements among the aforementioned elements, may omit some of them, or may further include additional elements. Operations performed by a module, programming module, or other elements may be executed in a sequential, parallel, repetitive, or heuristic manner. In addition, some of the operations may be executed in a different order or may be omitted, or other operations may be added.

In accordance with the embodiments described herein, there is provided an electronic device that includes a housing, a display that is exposed from one surface of the housing, one or more ultrasonic wave generators and one or more ultrasonic sensors that are disposed on one surface of the housing and positioned adjacent to the display, a processor that is positioned inside the housing and electrically connected with the ultrasonic wave generator and the ultrasonic sensor, and a memory that is positioned inside the housing and electrically connected with the processor, in which the memory may store instructions, by which the processor emits ultrasonic waves in a direction from one surface of the housing to the outside by using the ultrasonic wave generator, receiving reflected waves of the emitted ultrasonic waves reflected and returned from one or more objects through the ultrasonic sensor, and determines proximity between the electronic device and the object based on at least a part of a difference between a first time, at which the ultrasonic waves are mitted, and a second time, at which the reflected waves are received while being executed.

The electronic device may further include a speaker (a phone receiver) provided on one surface of the housing, in which the ultrasonic sensor may be disposed while being adjacent to the speaker. The speaker may be operated as the ultrasonic wave generator. The ultrasonic wave generator and the ultrasonic sensor may be operated as resonant type ultrasonic transducers detecting a contact before the object is in contact with one surface of the housing.

The electronic device may further include another ultrasonic wave generator and the ultrasonic sensor may be operated by different manners from those of the ultrasonic wave generator and the ultrasonic sensor. The ultrasonic wave generator and the ultrasonic sensor may be operated as resonant type ultrasonic transducers detecting a contact after the object is in contact with one surface of the housing.

The ultrasonic wave generator and the ultrasonic sensor may be disposed on the same surface of the electronic device.

In accordance with the embodiments described herein, there is provided a method of operating an electronic device. The method includes emitting a first ultrasonic signal through a first ultrasonic transducer, confirming whether a reception arrival time of reflected waves of the emitted first ultrasonic signal is within a threshold range, activating a second ultrasonic transducer and emitting a second ultrasonic signal when the reception arrival time of the reflected waves is within the threshold range, confirming a reflection coefficient based on the received reflected waves of the second ultrasonic signal, and performing a function corresponding to an object confirmed based on the confirmed reflection coefficient.

The method may further include activating a second ultrasonic transducer when it is detected that the first ultrasonic signal is totally reflected or that the electronic device is super-proximate to the object before the electronic device is in contact with the object.

The method may further include emitting, by the first ultrasonic transducer, the first ultrasonic signal through a speaker of the electronic device and receiving reflected waves of the first ultrasonic signal through a microphone.

The method may further include emitting a sound signal of an audible frequency band together with the first ultrasonic signal through the speaker and receiving a sound signal of a surrounding audible frequency band together with the reflected waves of the first ultrasonic signal.

The method may further include inactivating the first ultrasonic transducer when the second ultrasonic transducer is activated.

The method may further include confirming, by the second ultrasonic transducer, a kind of the object after the object is in contact with or super-proximate to the electronic device.

Confirming the reflection coefficient may include confirming a kind of object corresponding to a reflection coefficient stored in the electronic device.

The method may further include recognizing a flooding situation when the object is water, and when contact of a human body to the second ultrasonic transducer is detected in the flooding situation, performing an input function including at least one of a touch input or a gesture input by a drag.

The performing of the input function may include performing at least one function among a camera mode entering function, an image capturing mode, a volume up/down function, a function of switching from a sleep mode to an idle mode, and a power supply turn-off function.

In accordance with the embodiments described herein, there is provided a method for performing a proximity sensor function by implementing the ultrasonic transducer by using an existing receiver and speaker. The proximity sensor function is performed by using a speaker mounting space exposed to the outside of the electronic device, so that it is possible to improve a component mounting space. In doing so, it is possible to solve an error in a proximity situation and a super-proximate situation by using a reflection rate of an interface of different media together with the contact type ultrasonic transducer. Moreover, it is possible to protect the electronic device by detecting a flooding situation, and it is possible to perform various input functions by using an ultrasonic principle of the ultrasonic transducer in a flooding situation.

Performing the proximity sensor function may include when contact of a human body to the second ultrasonic transducer is detected, performing an input function including at least one of a touch input or a gesture input by a drag, switching from a sleep mode to an idle mode, and/or detecting contact of a human body when a call is initiated.

While the present disclosure has been shown and described with reference to certain embodiments thereof, it should be understood by those skilled in the art that many variations and modifications of the method, apparatuses, and systems described herein will still fall within the spirit and scope of the present disclosure as defined in the appended claims and their equivalents.

What is claimed is:
1. An electronic device, comprising:
a housing;
a display exposed from one surface of the housing;
a first ultrasonic transducer including an ultrasonic wave generator emitting a first ultrasonic signal and an ultrasonic sensor receiving reflected waves of the emitted first ultrasonic signal;
a second ultrasonic transducer including an ultrasonic wave generator emitting a second ultrasonic signal and an ultrasonic sensor receiving reflected waves of the emitted second ultrasonic signal, wherein the first ultrasonic transducer and the second ultrasonic transducer are disposed on the housing and adjacently positioned to the display;
a processor electrically connected to the first ultrasonic transducer and the second ultrasonic transducer; and
a memory electrically connected with the processor, wherein the memory stores instructions, by which the processor confirms whether a reception arrival time of reflected waves of the emitted first ultrasonic signal is within a threshold range, activates the second ultrasonic transducer and emits the second ultrasonic signal when the reception arrival time of the reflected waves is within the threshold range, confirms a reflection coefficient based on the received reflected waves of the second ultrasonic signal, and performs a function corresponding to an object confirmed based on the confirmed reflection coefficient.

2. The electronic device of claim 1, further comprising:
at least one speaker provided on the one surface of the housing,
wherein the ultrasonic sensor of the first ultrasonic transducer is disposed adjacent to at least one of the at least one speaker and the display.

3. The electronic device of claim 2, wherein the ultrasonic wave generator of the first ultrasonic transducer is operated through the at least one speaker.

4. The apparatus of claim 1, wherein the first ultrasonic transducer operates as resonant type ultrasonic transducers for detecting the object before the object contacts the one surface of the housing.

5. The electronic device of claim 1, wherein the first ultrasonic transducer is operated in a manner differently from the second ultrasonic transducer.

6. The electronic device of claim 1, wherein at least one of the first ultrasonic transducer and the second ultrasonic transducer is disposed on the one surface of the electronic device.

7. A method of operating an electronic device, comprising:
emitting a first ultrasonic signal through a first ultrasonic transducer;
confirming whether a reception arrival time of reflected waves of the emitted first ultrasonic signal is within a threshold range;
activating a second ultrasonic transducer and emitting a second ultrasonic signal when the reception arrival time of the reflected waves is within the threshold range;
confirming a reflection coefficient based on the received reflected waves of the second ultrasonic signal; and
performing a function corresponding to an object confirmed based on the confirmed reflection coefficient.

8. The method of claim 7, further comprising:
activating the second ultrasonic transducer when one of the first ultrasonic signal is totally reflected and the object becomes relatively close to the electronic device.

9. The method of claim 7, further comprising:
emitting, by the first ultrasonic transducer, the first ultrasonic signal through a speaker of the electronic device; and
receiving reflected waves of the first ultrasonic signal through a microphone of the electronic device.

10. The method of claim 9, further comprising:
emitting a sound signal of an audible frequency band together with the first ultrasonic signal through the speaker; and
receiving a sound signal of a surrounding audible frequency band together with the reflected waves of the first ultrasonic signal.

11. The method of claim 7, further comprising:
inactivating the first ultrasonic transducer when the second ultrasonic transducer is activated.

12. The method of claim 7, further comprising:
confirming, by the second ultrasonic transducer, a type of the object after the object is one of in contact with the electronic device and relatively close to the electronic device.

13. The method of claim 7, wherein confirming the reflection coefficient comprises confirming a type of the object corresponding to a reflection coefficient stored in the electronic device.

14. The method of claim 7, further comprising:
recognizing when the object is water; and
when contact of a portion of a human body to the second ultrasonic transducer is detected when the object is water, performing an input function including at least one of a touch input and a gesture input by a drag.

15. The method of claim 14, wherein performing the input function comprises performing at least one of a camera mode entering function, an image capturing mode function, a volume up/down function, a function of switching from a sleep mode to an idle mode, and a power supply turn-off function.

16. The method of claim 7, wherein performing the function comprises one of:
when contact of a portion of a human body to the second ultrasonic transducer is detected, performing an input function including at least one of a touch input and a gesture input by a drag;
switching from a sleep mode to an idle mode; and
detecting contact of a portion of a human body when a call is initiated.

17. An electronic device, comprising:
a non-contact type ultrasonic transducer including a transmitter emitting a first ultrasonic signal and a receiver receiving reflected waves of the emitted first ultrasonic signal;
a contact type ultrasonic transducer configured to emit a second ultrasonic signal and receive reflected waves of the emitted second ultrasonic signal; and
a processor connected to the non-contact type ultrasonic transducer and the contact type ultrasonic transducer and configured to: confirm whether a reception arrival time of reflected waves of the emitted first ultrasonic signal is within a threshold range, activate the contact type ultrasonic transducer and emit the second ultrasonic signal when the reception arrival time of the reflected waves is within the threshold range, confirm a reflection coefficient based on the received reflected waves of the second ultrasonic signal, and perform a function corresponding to an object confirmed based on the confirmed reflection coefficient.

18. The electronic device of claim 17, wherein the transmitter is a speaker for emitting a sound signal of an audible frequency band together with the first ultrasonic signal, and the receiver is a microphone for receiving a sound signal of a surrounding audible frequency band together with the reflected waves of the first ultrasonic signal.

19. The electronic device of claim 17, wherein when a portion of a human body contacts the contact type ultrasonic transducer, the processor if further configured to one of:
perform an input function including at least one of a touch input and a gesture input by a drag;
switch from a sleep mode to an idle mode; and
detect contact of a portion of a human body when a call is initiated.

* * * * *